United States Patent
Suga et al.

(10) Patent No.: US 6,215,467 B1
(45) Date of Patent: *Apr. 10, 2001

(54) DISPLAY CONTROL APPARATUS AND METHOD AND DISPLAY APPARATUS

(75) Inventors: Kazumi Suga; Yoshikazu Shibamiya, both of Yokohama; Tatsuya Nakajima; Kenji Inoue, both of Hiratsuka; Masayuki Sawada, Atsugi, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/638,234

(22) Filed: Apr. 26, 1996

(30) Foreign Application Priority Data

| Apr. 27, 1995 | (JP) | 7-103982 |
| Apr. 27, 1995 | (JP) | 7-103983 |
| Feb. 20, 1996 | (JP) | 8-032499 |

(51) Int. Cl.[7] ................................... G09Q 5/00
(52) U.S. Cl. ................. 345/132; 345/138; 345/141; 345/127; 348/552; 348/558; 348/569
(58) Field of Search .................. 345/132, 3, 112, 345/127, 141, 128–130, 467, 441, 472, 116, 138; 348/552–558, 565–567, 569

(56) References Cited

U.S. PATENT DOCUMENTS

| 4,998,100 | * | 3/1991 | Ishii | 345/3 |
| 5,014,129 | * | 5/1991 | Imarishi | 345/132 |
| 5,045,946 | * | 9/1991 | Yu | 348/565 |
| 5,072,214 | * | 12/1991 | Dellinger et al. | 345/116 |
| 5,103,311 | * | 4/1992 | Sluijer et al. | 348/571 |
| 5,111,190 | * | 5/1992 | Zenda | 345/132 |
| 5,180,947 | * | 1/1993 | McGill | 313/85 |
| 5,185,817 | * | 2/1993 | Regi et al. | 345/132 |
| 5,293,485 | * | 3/1994 | Zenda | 345/3 |
| 5,351,064 | * | 9/1994 | Zenda | 345/132 |
| 5,398,083 | * | 3/1995 | Tsujihara et al. | 348/807 |
| 5,461,428 | * | 10/1995 | Yoo | 348/558 |
| 5,543,857 | * | 8/1996 | Wehmeyer et al. | 348/589 |
| 5,589,850 | * | 12/1996 | Lin et al. | 345/132 |
| 5,606,431 | * | 2/1997 | Park | 358/503 |
| 5,608,425 | * | 3/1997 | Movshovich | 345/112 |
| 5,610,663 | * | 3/1997 | Nan et al. | 348/554 |
| 5,657,034 | * | 8/1997 | Yamazaki | 345/132 |
| 5,796,442 | * | 8/1998 | Gove et al. | 348/556 |
| 6,011,539 | * | 1/2000 | Hamilton et al. | 345/141 |

* cited by examiner

Primary Examiner—Lun-Yi Lao
(74) Attorney, Agent, or Firm—Fitzpatrick, Cella, Harper & Scinto

(57) ABSTRACT

A display control apparatus having a plurality of different display modes for displaying a plurality of types of image signals corresponding to different resolutions and dot clocks, includes a discrimination circuit for displaying the display mode of the currently displayed image signal, and a selection circuit for selecting on-screen display data to be displayed on the basis of the display mode discriminated by the discrimination circuit. In addition, an input circuit inputs the on-screen display data selected by the selection circuit in place of the currently displayed image data, and an output circuit outputs the on-screen display data input by the input circuit in the display mode of the image signal.

13 Claims, 32 Drawing Sheets

FIG. 18
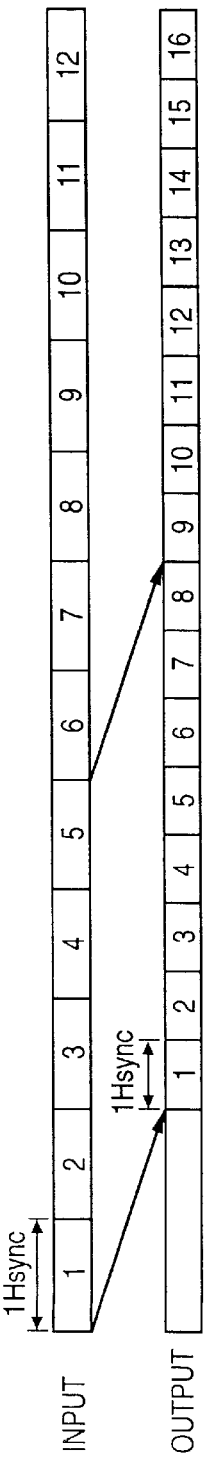
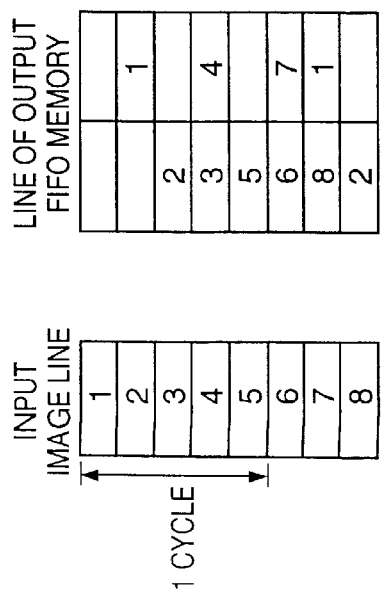

DISPLAY APPARATUS SIZE

DISPLAY APPARATUS SIZE

FIG. 27

| VIDEO SIGNAL INPUT | COMPUTER SIGNAL INPUT |
|---|---|
| 1 : SWITCH TO TV | 1 : SWITCH TO PC |
| 2 : SOUND VOLUME ADJUSTMENT | 2 : INCOMPATIBLE DISPLAY SIGNAL INPUT |
| 3 : MODE SELECTION MENU | 3 : SOUND VOLUME ADJUSTMENT |
| 4 : LANGUAGE SELECTION | 4 : MODE SELECTION MENU |
| 5 : TV SIGNAL TYPE SELECTION (COMPOSITE SIGNAL/ YC SEPARATED SIGNAL) | 5 : LANGUAGE (ENGLISH/JAPANESE) SELECTION |
| 6 : SOUND TYPE (NORMAL/SIMULATEDSTEREO/ SURROUND STEREO) | 6 : SOUND TYPE (NORMAL/SIMULATEDSTEREO/ SURROUND STEREO) |
| 7 : CONTRAST ADJUSTMENT | 7 : γ VALUE SELECTION |
| 8 : BRIGHTNESS ADJUSTMENT | 8 : GRADATION SELECTION |
| 9 : SATURATION ADJUSTMENT | 9 : PHASE ADJUSTMENT |
| 10 : HUE ADJUSTMENT | 10 : DISPLAY POSITION ADJUSTMENT (HORIZONTAL DISPLAY START, VERTICAL DISPLAY START, HORIZONTAL DISPLAY WIDTH) |
|  | 11 : DPMS (ON/OFF, OFF MODE SHIFT TIME ,SUSPEND MODE SHIFT TIME) SELECTION |
|  | 12 : MANUAL MODEL SELECITON | ably, the OSD data has font sizes and shapes corresponding to respective display modes, and the selection
DISPLAY CONTROL APPARATUS AND METHOD AND DISPLAY APPARATUS

BACKGROUND OF THE INVENTION

The present invention relates to a display control apparatus and method for a display, and a display apparatus comprising the display control apparatus and, more particularly, to a display control apparatus and method suitable for display control of a display apparatus having a dot matrix display.

A display control apparatus, which receives television input signals of the NTSC, PAL, SECAM systems, and the like, and computer input signals from a personal computer, a workstation, and the like, and displays the input signal on a display apparatus, is known.

In recent years, a so-called OSD (on-screen display) technique that makes a display for facilitating various kinds of adjustment processing is known. An operator can easily perform various kinds of adjustment processing (e.g., brightness, contrast, and the like of the display screen) of the display apparatus by operating various operation keys of the display apparatus while observing the OSD.

On the other hand, a so-called P&P (Plug and Play) display interface, which directly receives an analog input signal (CRT signal) input from various kinds of host computers to a CRT display apparatus, and converts it into a signal that can be displayed on a stand-alone type liquid crystal display apparatus, is known. The P&P interface is a very effective interface upon replacement of the CRT display apparatus with the stand-alone type liquid crystal display apparatus.

In the above-mentioned P&P interface, a demand has arisen for realization of a multisync P&P interface, which can cope with various input signals from, e.g., a personal computer, workstation, TV, VTR, and the like, and can also cope with a change in display mode (display resolution) of a personal computer. However, upon realization of such multisync P&P interface, since an input signal from a host computer has a resolution and dot clocks different from those of an input signal from a TV, VTR, or the like, these input signals and the OSD data cannot be simply selectively output.

When the OSD data is superimposed on image data, it is strongly demanded to always display the OSD data on the screen to have the same size independently of the resolution.

SUMMARY OF THE INVENTION

The present invention has been made in consideration of the above-mentioned problems, and has as its object to provide a display control method and apparatus, and a display apparatus, which can appropriately display OSD data in correspondence with display states with different image resolutions and dot clocks.

In order to achieve the above object, a display control apparatus according to an embodiment of the present invention comprises the following arrangement. That is, there is provided a display control apparatus having a plurality of different display modes for displaying a plurality of types of image signals corresponding to different resolutions and dot clocks, comprising: discrimination means for displaying a display mode of a currently displayed image signal; selection means for selecting OSD data to be displayed on the basis of the display mode discriminated by the discrimination means; input means for inputting the OSD data selected by the selection means in place of the currently displayed image data; and output means for outputting the OSD data input by the input means in the display mode of the image signal.

Preferably, the OSD data has font sizes and shapes corresponding to respective display modes, and the selection means selects the OSD data so as to obtain an appropriate character size and shape in each display mode. In this manner, driving condition differences in various display modes can be absorbed, and the OSD data can be stably displayed.

Preferably, the font size and shape are determined on the basis of a dot clock speed in each display mode and an input speed of the OSD data by the input means. In this manner, even when the image of the OSD data is enlarged or reduced in size in correspondence with dot clock differences of the display modes, OSD data having a font size and shape corresponding to the enlarged or reduced size is used to maintain a desired size and shape.

Preferably, the OSD data has display contents corresponding to respective display modes, and the selection means selects the OSD data having appropriate display contents in each display mode. In this manner, appropriate operations can be attained in the respective display modes.

Preferably, the plurality of display modes include a first display mode for displaying at least a composite video signal, and a second display mode for displaying a computer CRT signal. In this manner, the display control apparatus having typical display modes with different driving formats and a broad application range can be provided.

When the OSD data is displayed in the first display mode, the output means preferably performs, for the input OSD data, the same processing as processing that is performed for an RGB signal obtained by converting the composite video signal, and outputs the processed OSD data.

With the above-mentioned arrangement, in the display control apparatus having a plurality of different display modes for displaying a plurality of types of image signals corresponding to different resolutions and dot clocks, OSD display operations matching the respective display modes can be attained. Such operations are attained as follows. The discrimination means discriminates the display mode of the currently displayed image signal, and the selection means selects OSD data to be displayed on the basis of the display mode discriminated by the discrimination means. When the input means inputs the selected OSD data in place of the currently displayed image data, the output means outputs the input OSD data in the display mode of the image signal displayed immediately therebefore.

For this reason, OSD data matching an input signal from a host computer or an input signal from a TV, VTR, or the like can be appropriately output, and a multisync P&P interface can be realized.

It is another object of the present invention to provide a display control apparatus which can display OSD data with a predetermined size independently of the display resolution of an input signal.

In order to achieve the above object, in another embodiment of the present invention, there is provided a display control apparatus comprising: enlargement means for enlarging the number of horizontal pixels of image data up to the number of pixels that can be displayed by a display; interpolation means for interpolating the number of vertical lines of the image data processed by the enlargement means to obtain the number of pixels that can be displayed by the display; and display processing means for performing processing for adding predetermined display data to the image data processed by the interpolation means, and supplying sum data to the display.

According to the present invention, data can be displayed on a dot matrix display in the maximum possible enlarged scale in correspondence with various resolutions, and OSD data can always be displayed to have a predetermined size.

Other objects and features of the present invention will become apparent from the following detailed description taken in conjunction with the accompanying drawings.

BRIEF DESCRIPTION OF THE DRAWINGS

FIG. 18 is a view for explaining a schematic operation for attaining vertical interpolation processing in the case of 800 dots (horizontal)×600 lines (vertical) in the VESA standard;

FIG. 27 is a table showing a list of OSD display items in a video signal display mode and a computer signal display mode;

DETAILED DESCRIPTION OF THE PREFERRED EMBODIMENTS

The preferred embodiments of the present invention will be described hereinafter with reference to the accompanying drawings.

Figure 1:
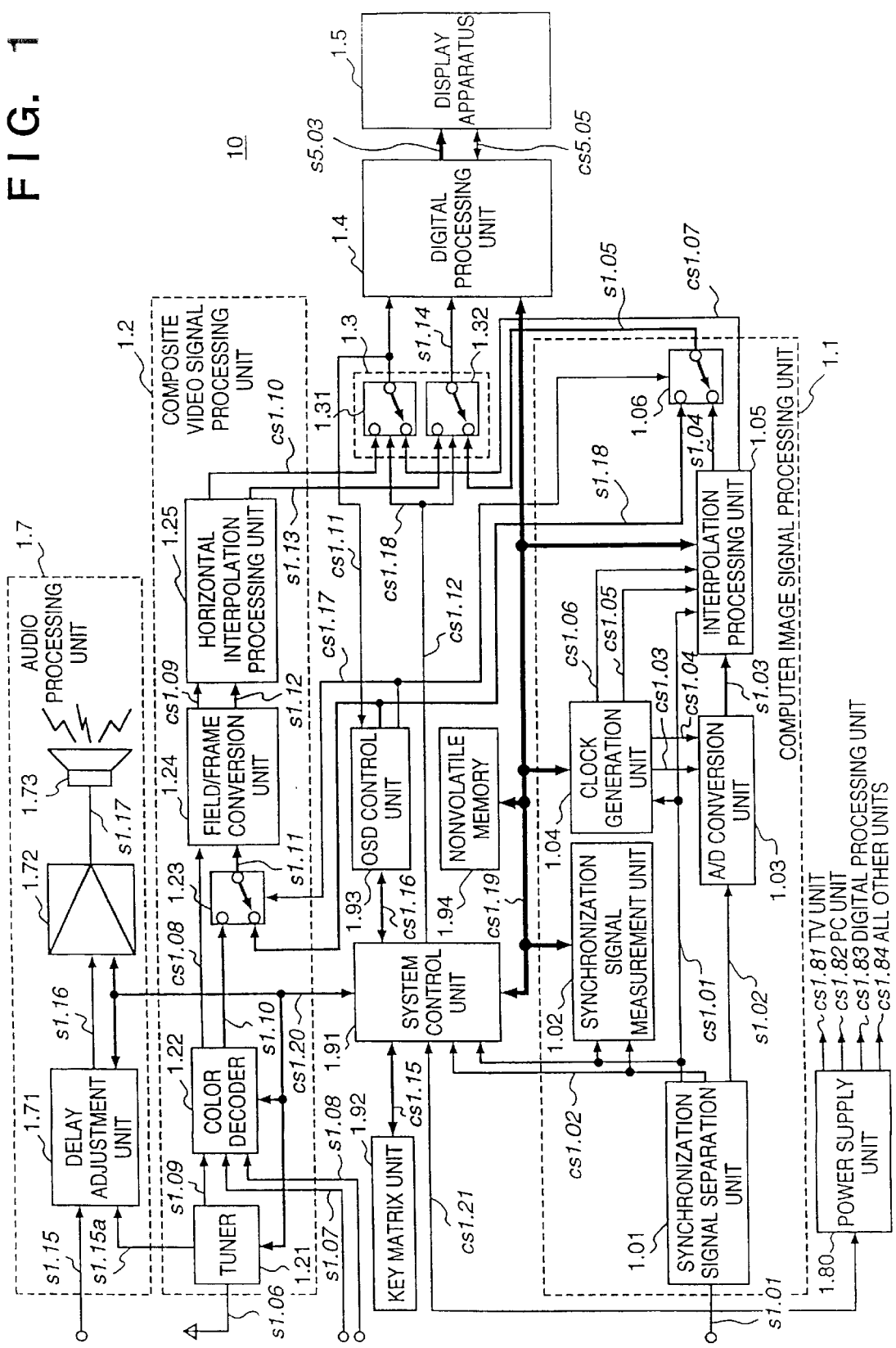
FIG. 1 is a block diagram of a display control apparatus 10 according to an embodiment of the present invention.

FIG. 1 is a block diagram showing a display control apparatus 10 according to the present invention. The display control apparatus 10 of the present invention receives composite video signal inputs and YC (luminance, color difference) separated signal inputs of the NTSC, PAL, SECAM systems, and the like, and analog computer input signals from a PC (personal computer), WS (workstation), and the like, and can display the input signal on a display apparatus 1.5.

A composite video signal processing unit 1.2 will be explained below.

A composite analog image signal of the NTSC, PAL, SECAM system, or the like input directly or via a tuner 1.21 is subjected to A/D conversion, color difference demodulation, and matrix conversion to R, G, and B signals in a color decoder 1.22. On the other hand, a YC-separated image signal is subjected to A/D conversion and matrix conversion to R, G, and B signals in the color decoder 1.22 to obtain R, G, and B field data. The R, G, and B field data are converted from 60-Hz field data into 60-Hz frame data in a field/frame conversion unit 1.24.

Since the converted frame data are to be subjected to interpolation processing in a horizontal interpolation processing unit 1.25 to have a horizontal resolution equal to that of the display apparatus 1.5, they are obtained by reading out identical data twice.

An audio processing unit 1.7 will be explained below.

A delay processing unit 1.71 is controlled by a system control unit 1.91 to adjust the difference between an image display operation on the display apparatus 1.5 and an audio signal output from a loudspeaker 1.73. On the display apparatus 1.5, the image display operation causes a slight delay between the upper left portion and right corners of a displayed image depending on the use temperature of the main body. For this reason, when a dynamic image and an audio signal must be synchronized with each other like in a TV signal, a time discrepancy is generated between an image which is influenced by temperature and an audio signal which is not influenced by temperature. In order to avoid this phenomenon, the temperature information of the display apparatus 1.5 is fed back to the system control unit 1.91. The system control unit 1.91 controls the delay adjustment unit 1.71 on the basis of the feedback information to generate an audio delay time so as to synchronize the image and the audio signal. That is, when the image display operation is delayed, the audio signal is controlled to be delayed.

In this case, the audio delay time to be generated is acquired by looking up a correlation table, which is prepared in advance and stores the correlation among the temperature of the display apparatus 1.5, the image, and the image display delay time. With this delay adjustment, the image and the audio signal can be synchronized with each other independently of the change in temperature of the display apparatus.

The delay-adjusted audio signal is supplied to an audio signal processing unit 1.72. The audio signal processing unit 1.72 has a surround processor, an audio amplifier, and the like. The surround processor performs sound volume adjustment, stereo/monaural selection, balance adjustment between right and left loudspeakers, tone control, surround processing, and the like of the audio input under the control of the system control unit 1.91.

The audio signal output from the surround processor 1.72 is input to the audio amplifier, and is subjected to amplification processing for the loudspeaker 1.73. The amplified audio signal is supplied to the loudspeaker 1.73 and is output as an actual sound.

A computer image signal processing unit 1.1 will be described below.

An analog computer image signal from, e.g., a PC, WS, or the like is separated into horizontal and vertical synchronization signals and analog R, G, and B signals in a synchronization signal separation unit 1.01. The synchronization signal separation unit 1.01 will be described in detail below. The synchronization signal separation unit 1.01 receives a video signal s1.01 including R, G, and B image signals and a synchronization signal such as a composite sync signal, separate sync signal, sync-on-green signal, or the like from a computer or the like, and outputs an image signal s1.02 to an A/D conversion unit 1.03. A synchronization signal cs1.01 is obtained by converting the synchronization signal separated from the input video signal into a negative synchronization signal, and is supplied to a synchronization signal measurement unit 1.02, a clock generation unit 1.04, an interpolation processing unit 1.05, and the system control unit 1.91. A synchronization signal polarity discrimination signal cs1.02 indicates the polarity of the input synchronization signal s1.01, and is supplied to the system control unit 1.91.

The horizontal and vertical synchronization signals separated by the synchronization signal separation unit 1.01 are input to the synchronization signal measurement unit 1.02 so as to measure the horizontal and vertical frequencies, horizontal and vertical synchronization signal polarities, and the like.

Figure 2:
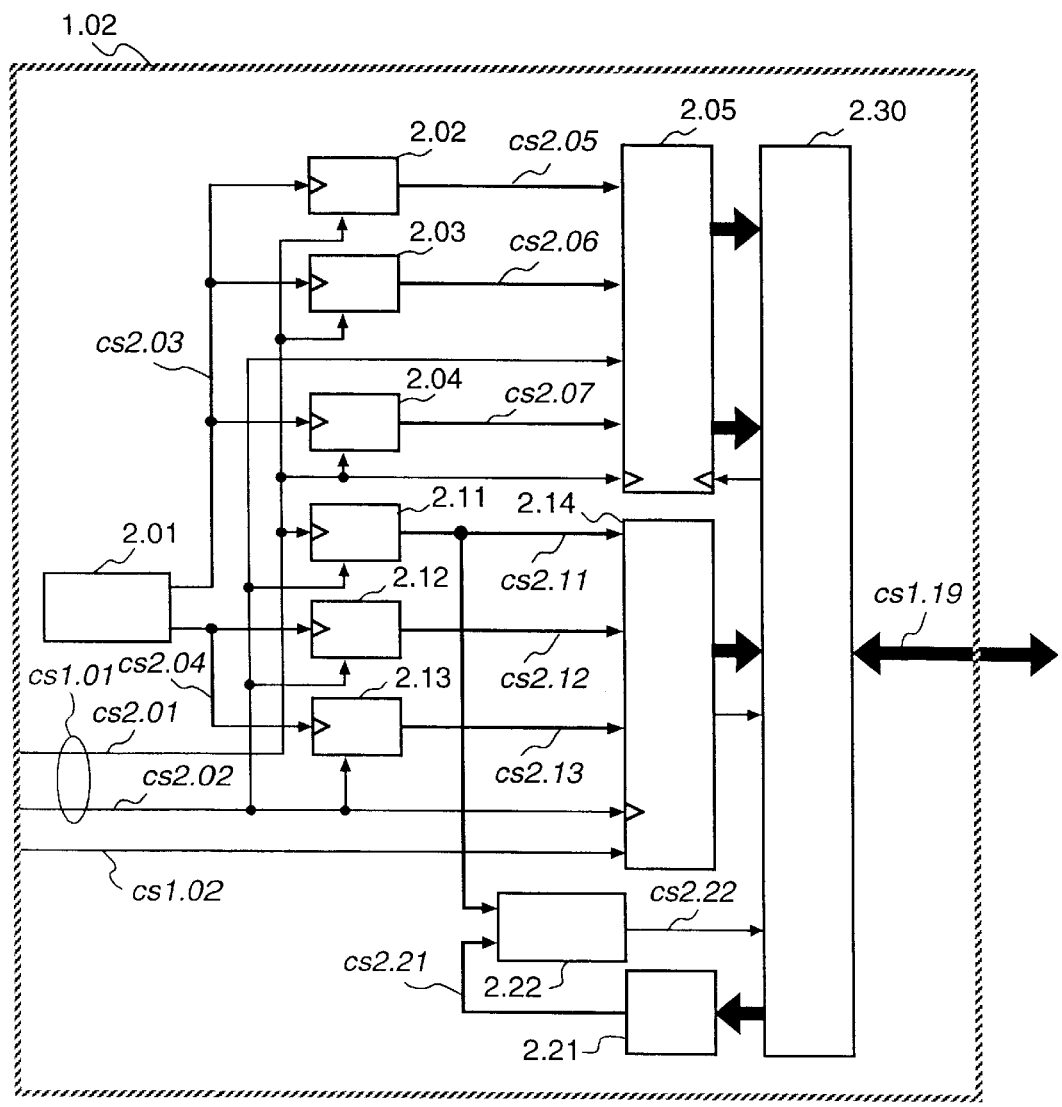
FIG. 2 is a detailed block diagram showing the control arrangement of a synchronization signal measurement unit.

The processing executed in the synchronization signal measurement unit 1.02 will be described in detail below with reference to FIG. 2. FIG. 2 is a detailed block diagram showing the arrangement of the synchronization signal measurement unit 1.02.

Reference numeral 2.01 denotes a clock generator for generating clocks cs2.03 and cs2.04 having predetermined frequencies sufficiently higher than those defined by the periods of a horizontal synchronization signal (HD) cs2.01 and a vertical synchronization signal (VD) 2.02 so as to measure the periods of these signals.

Reference numeral 2.02 denotes a counter for measuring the period of the horizontal synchronization signal HD (cs2.01). The counter 2.02 is reset in response to the trailing edge of the horizontal synchronization signal HD (cs2.01), and counts the clocks cs2.03 having a predetermined frequency and supplied from the clock generator 2.01 during the period from the reset timing to the next trailing edge of the signal HD. A measurement count value THD1 (cs2.05) as the count result of the counter 2.02 is written in a FIFO memory 2.05 in synchronism with the leading edge of the horizontal synchronization signal HD.

Reference numeral 2.03 denotes a counter for measuring the frequency of the horizontal synchronization signal HD (cs2.01). The counter 2.03 is reset in response to the leading edge of the horizontal synchronization signal HD (cs2.01), and counts the clocks cs2.03 during the period from the reset timing to the next leading edge of the signal HD. A count value THD2 (cs2.06) of the counter 2.03 is written in the FIFO memory 2.05 in synchronism with the leading edge of the horizontal synchronization signal HD.

Reference numeral 2.04 denotes a counter for measuring the blanking period, THBlank ("0" level period of the horizontal synchronization signal HD), of the horizontal synchronization signal HD (cs2.01). The counter 2.04 is reset in response to the trailing edge of the horizontal synchronization signal HD (cs2.01), and counts the clocks cs2.03 having a predetermined frequency and supplied from the clock generator 2.01 during the period from the reset timing to the next leading edge of the signal HD. A measurement counter value THBlank (cs2.07) as the measurement result of the counter 2.04 is written in the FIFO memory 2.05 in synchronism with the leading edge of the horizontal synchronization signal HD.

Figure 3:
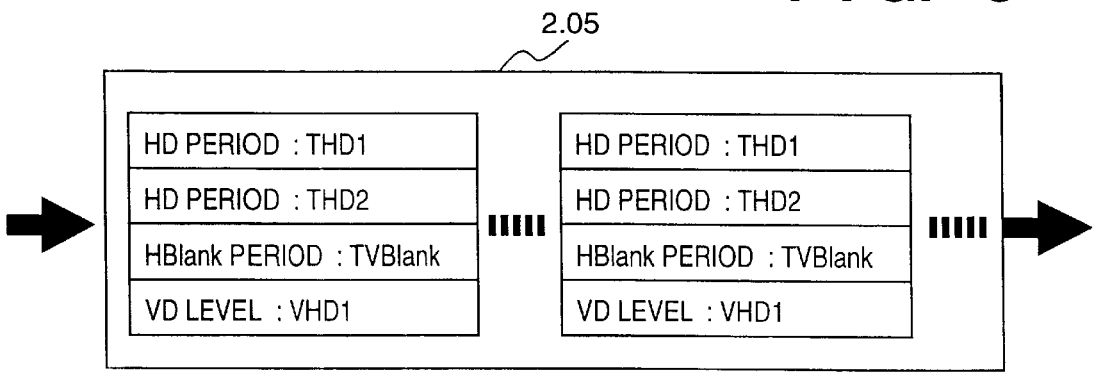
FIG. 3 is a view showing the storage state of data in a FIFO memory in the synchronization signal measurement unit.

Reference numeral 2.05 denotes a FIFO memory which stores the above-mentioned data THD1 (cs2.05), THD2 (cs2.06), and THBlank (cs2.07) for one period of the vertical synchronization signal VD. FIG. 3 shows the data storage state in the FIFO memory 2.05 in the synchronization signal measurement unit 1.02. These data can be read out as a signal csl.19 via an R/W control unit 2.30 in a FIFO manner.

Reference numeral 2.11 denotes a counter for measuring the number of horizontal synchronization signals HD during one period of the vertical synchronization signal VD. The counter 2.11 is reset in response to the leading edge of the vertical synchronization signal VD (cs2.02), and counts horizontal synchronization signals HD (cs2.01) as clocks until the next leading edge of the signal VD. A measurement counter value NHD (cs2.11) as the measurement result of the counter 2.11 is written in a register 2.14 in synchronism with the leading edge of the vertical synchronization signal VD.

Reference numeral 2.12 denotes a counter for measuring the period of the vertical synchronization signal VD (cs2.02). The counter 2.12 is reset in response to the leading edge of the vertical synchronization signal VD (cs2.02), and counts the clocks cs2.04 having a predetermined frequency and supplied from the clock generator 2.01 during one period from the reset timing to the next leading edge of the signal VD. A measurement counter value TVD (cs2.12) as the measurement result of the counter 2.12 is written in the register 2.14 in synchronism with the leading edge of the vertical synchronization signal VD.

Reference numeral 2.13 denotes a counter for measuring the blanking period time, VBlank ("0" level period of the vertical synchronization signal VD), of the vertical synchronization signal VD. The counter 2.13 is reset in response to the trailing edge of the vertical synchronization signal VD (cs2.02), and counts the clocks cs2.04 having a predetermined frequency and supplied from the clock generator 2.01 during the period from the reset timing to the next leading edge of the signal VD. A measurement count value TVBlank (cs2.13) as the measurement result of the counter 2.13 is written in the register 2.14 in synchronism with the leading edge of the signal VD.

Figure 4:
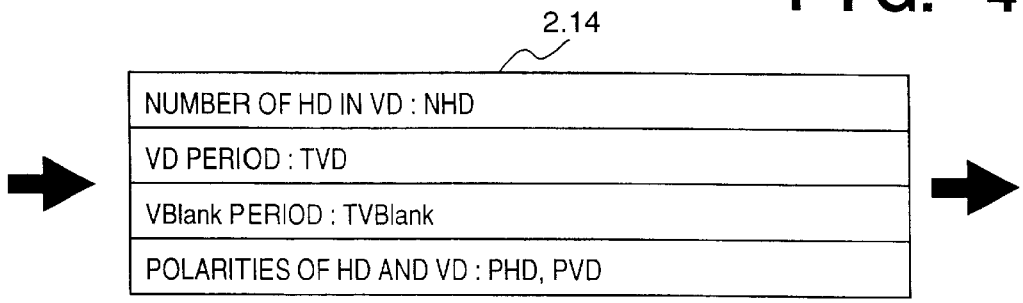
FIG. 4 is a view showing the data storage state of a register in the synchronization signal measurement unit.

Reference numeral 2.14 denotes a register which stores the above-mentioned data NHD (cs2.11), TVD (cs.2.12), and TVBlank (cs2.13), and the polarity of VD·HD (cs1.02) in synchronism with the vertical synchronization signal VD (cs2.02), as shown in FIG. 4. FIG. 4 shows the data storage state in the register 2.14 in the synchronization signal measurement unit 1.02. Upon completion of writing of the above-mentioned data, a control signal cs1.19 is output onto a bus via the R/W control unit 2.30.

Reference numeral 2.21 denotes a comparison register which stores the number of horizontal synchronization signals HD to be compared via cs1.19.

Reference numeral 2.22 denotes a comparator, which compares the HD counter output cs2.11 from the counter 2.11 and the comparison register output cs2.21 from the comparison register 2.21. As a result of comparison, if the two values coincide with each other, the comparator 2.22 activates a comparator output cs2.22, and outputs it via the R/W control unit 2.30.

Reference numeral 2.30 denotes an R/W control unit for performing data transfer control to transfer the outputs from the FIFO memory 2.05, the register 2.14, the comparison register 2.21, and the comparator 2.22 onto the control bus as the signal cs1.19.

The measurement values obtained by the synchronization signal measurement unit 1.02 are supplied to the system control unit 1.91 shown in FIG. 1. The system control unit 1.91 discriminates the display mode of an input signal on the basis of the input measurement values. The system control unit 1.91 performs setting operations required for the clock generation unit 1.04, the interpolation processing unit 1.05, and an OSD (on-screen display) control unit 1.93 on the basis of the discriminated display mode.

Figure 5:
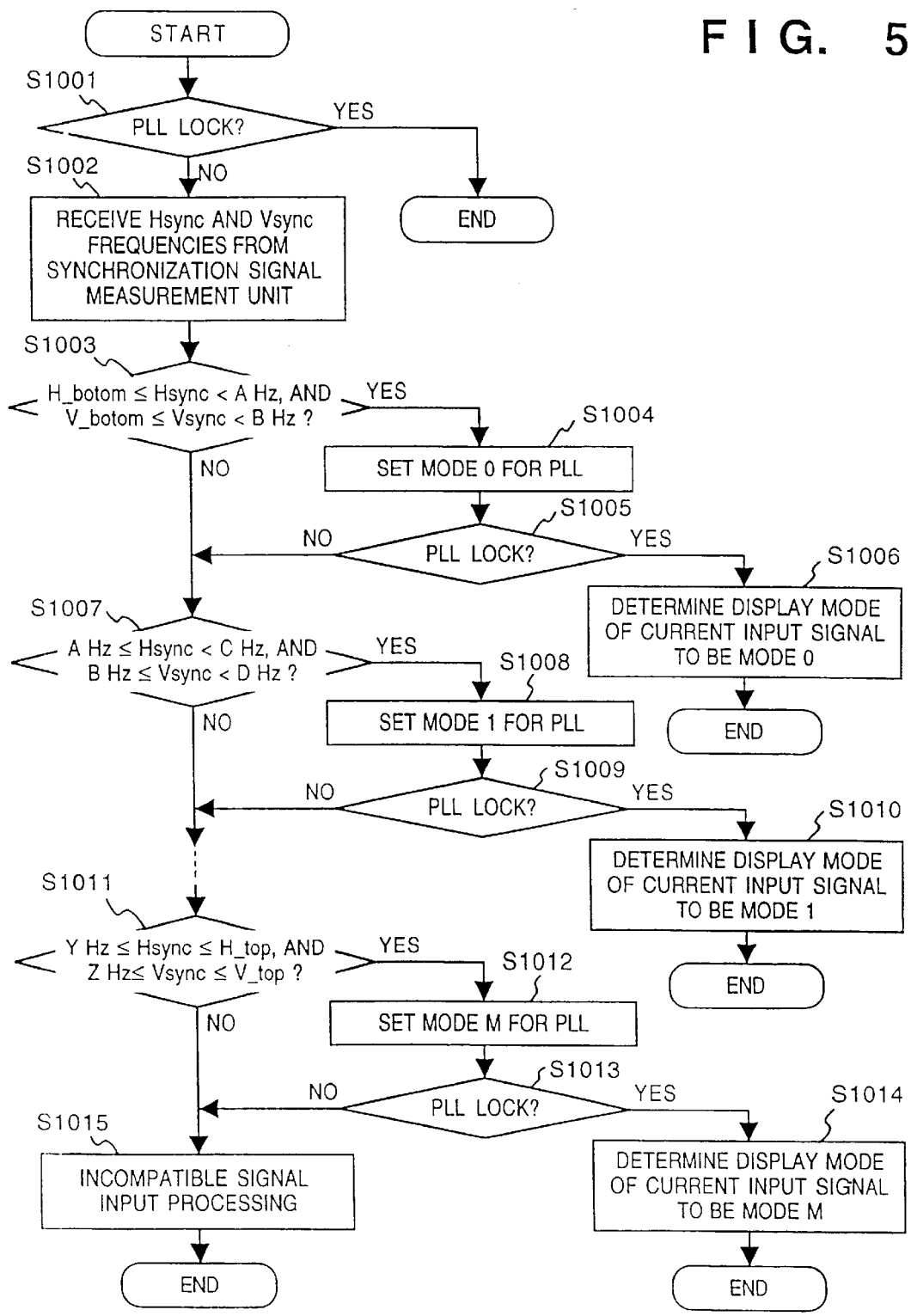
FIG. 5 is a flow chart showing the display mode discrimination sequence.

The display mode discrimination will be described in detail below with reference to the flow chart shown in FIG. 5. FIG. 5 is a flow chart showing the display mode discrimination sequence in this embodiment. If the system control unit 1.91 receives an unlock signal from the clock generation unit 1.04 in step S1001, it detects that the display mode of an input signal has changed or the host computer itself has been replaced by one having another signal specifications, and the flow advances to step S1002. Otherwise, i.e., if the clock generation unit 1.04 outputs a clock signal, the flow ends without any processing.

In step S1002, the system control unit 1.91 receives the frequencies (Hsync and Vsync) of the horizontal and vertical synchronization signals HD and VD from the synchronization signal measurement unit 1.02. In step S1003, it is checked if the received frequency Hsync of the horizontal synchronization signal falls within the range from the lowest corresponding frequency (H_botom) to A Hz, and the received frequency Vsync of the vertical synchronization signal falls with the range from the lowest corresponding frequency (V_botom) to B Hz. If Y (YES) in step S1003, the flow advances to step S1004, and the system control unit 1.91 performs a setting operation for MODE 0 of the clock generation unit 1.04. In step S1005, the system control unit 1.91 receives a lock or unlock signal from the clock generation unit 1.04. If the system control unit 1.91 does not receive any lock signal, it determines in step S1006 that the current display mode of the input signal is MODE 0.

Otherwise, if the system control unit 1.91 receives an unlock signal, it determines that the current display mode of the input signal is not MODE 0, and subsequently performs discrimination processing (the flow advances to step S1007). Similarly, the system control unit 1.91 performs processing up to MODE M. If the input signal cannot be specified until MODE M, the system control unit 1.91 determines that the current input signal is an incompatible signal, and performs input processing of an incompatible signal in step S1015.

The analog R, G, and B signals s1.02 after synchronization signals are separated are sampled by the A/D conversion unit 1.03 by sampling clocks to have a horizontal resolution equal to that of the dot matrix display. The sampling clocks are generated by the clock generation unit 1.04.

Figure 6:
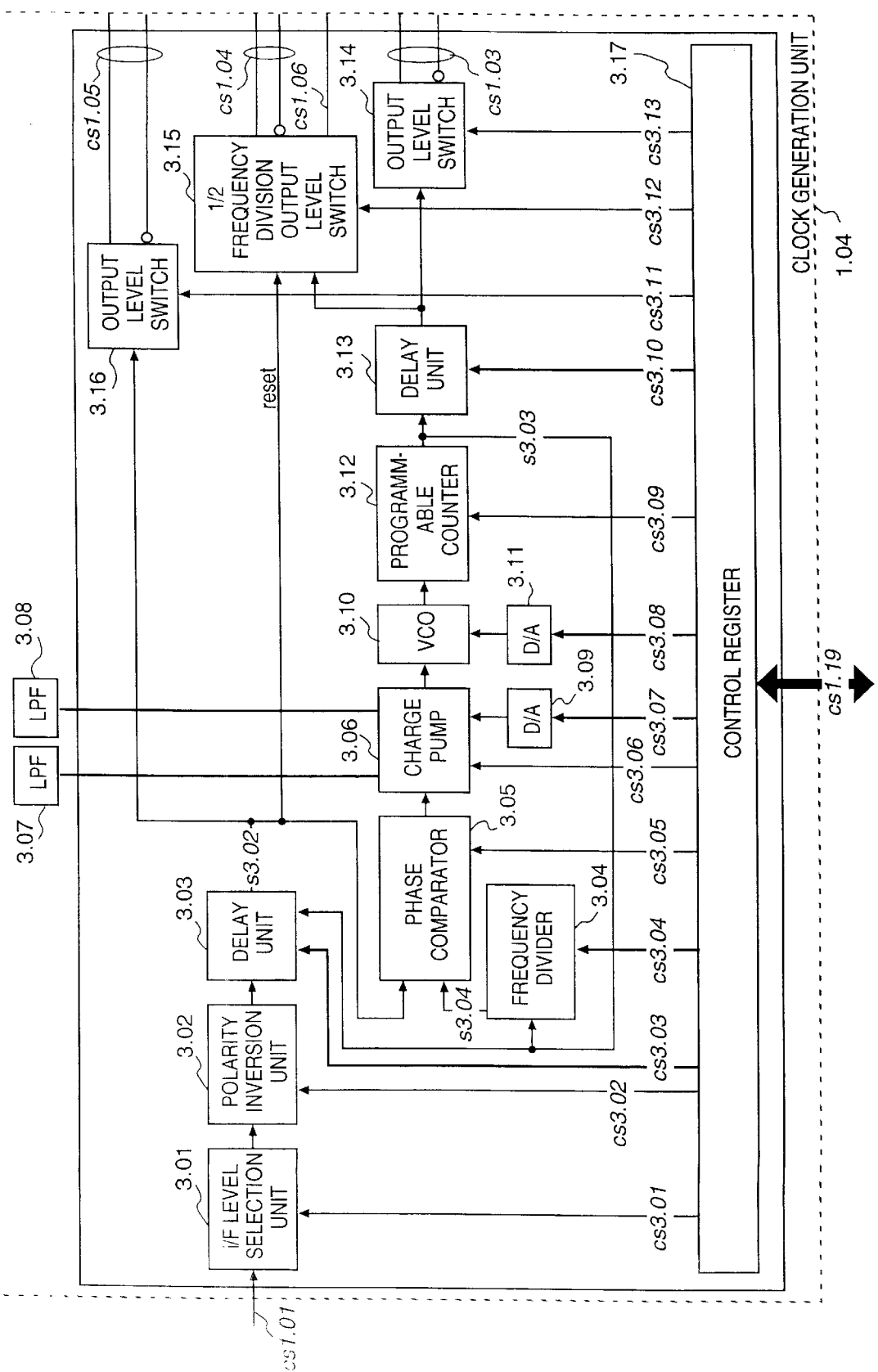
FIG. 6 is a block diagram showing the arrangement of a clock generation unit 1.04.

The function of the clock generation unit 1.04 will be described in detail below with reference to FIG. 6. FIG. 6 is a block diagram showing the arrangement of the clock generation unit 1.04. As shown in FIG. 6, the clock generation unit 1.04 is a PLL (Phase Locked Loop) clock generator that includes a phase comparator 3.05, a charge-pump type low-pass filter (3.06 to 3.08), a VCO (Voltage-controlled Oscillator) 3.10, and a frequency divider 3.04 as basic components. Reference numeral 3.17 denotes a control register which serves as a register group in which data for controlling the clock generation unit 1.04 are set.

A horizontal synchronization signal H of a video signal is supplied to an i/F level selection unit 3.01. The i/F level selection unit 3.01 switches an i/F signal interface to cope with a signal interface (e.g., TTL, PECL, or the like) output from the synchronization signal separation unit 1.01. The switching operation of the i/F signal interface is attained in correspondence with a control signal cs3.01 based on data stored in the control register 3.17. A polarity inversion unit 3.02 allows phase comparison at either the leading or trailing edge of the horizontal synchronization signal H, and switches the polarity in accordance with a polarity switching control line cs3.02.

A delay unit 3.03 receives a horizontal synchronization signal cs3.01 and a dot clock signal s3.03 (output from a programmable counter 3.12), and programmably performs delay adjustment for one period or more of the dot clock signal with respect to the horizontal synchronization signal cs3.01. The delay time is adjusted based on a delay control line cs3.03. An input video signal sl.10 is separated into synchronization signals and an image signal by the synchronization signal separation unit 1.01. Since these signals are input to different processing systems, a phase difference is generated between image data s1.02 input to the A/D conversion unit 1.03 and A/D conversion sampling clocks cs1.03 generated by the clock generation unit 1.04. In view of this problem, the delay unit 3.03 adjusts the phases of the image data s1.02 and the sampling clocks s1.03. The delay-adjusted horizontal synchronization signal is output onto a signal line s3.02 as a reference horizontal synchronization signal.

The frequency divider 3.04 frequency-divides the dot clock signal s3.03 output from the programmable counter 3.12 with a frequency division value set in the control register 3.17 by the system control unit 1.91. The frequency division value is set in an internal counter of the frequency divider 3.04 via a frequency divider control bus cs3.04.

Figure 7:
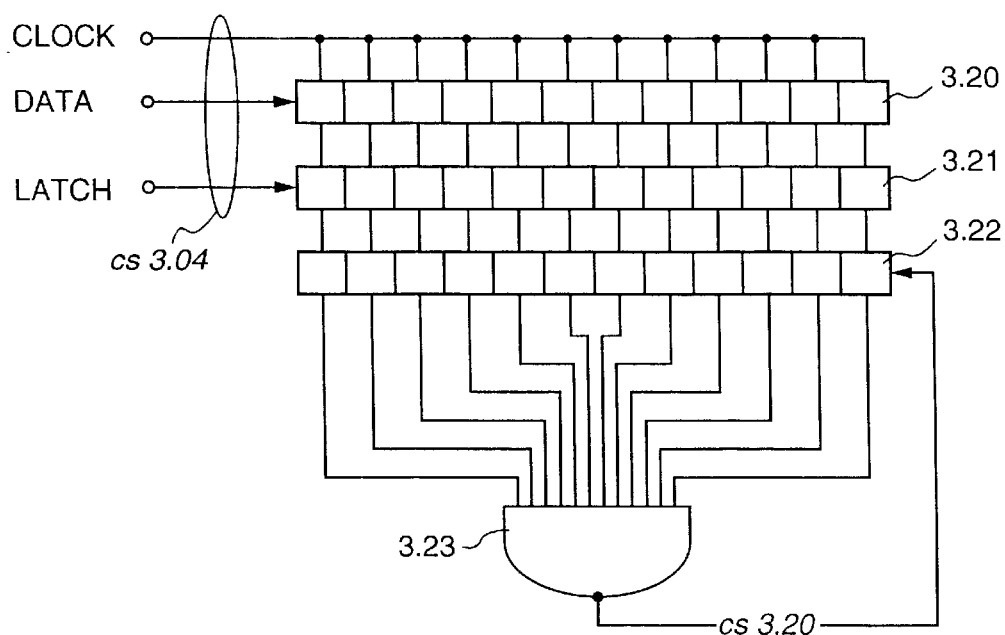
FIG. 7 is a block diagram showing the arrangement of a counter in a frequency divider.

FIG. 7 is a block diagram showing the arrangement of the counter of the frequency divider 3.04. The frequency divider control bus cs3.04 includes CLOCK, DATA, and LATCH signals, as shown in FIG. 7, and the DATA signal is serially transferred to a shift register 3.20 in synchronism with the CLOCK signal. Upon completion of transfer of the DATA signal, the data in the shift register 3.20 is output to a register 3.21 in response to the LATCH signal. The data in the register 3.21 is transferred to a main divider 3.22 upon reception of a LOAD signal cs3.20.

The phase comparator 3.05 shown in FIG. 6 receives the delay-adjusted reference horizontal synchronization signal s3.02 and an output signal s3.04 from the frequency divider 3.04, and compares the phases of the input signals to generate a voltage or a pulse signal corresponding to the phase difference. A phase comparison enable control signal cs3.05 controls whether or not the phase comparator 3.05 performs phase comparison between the reference horizontal synchronization signal s3.02 and the output signal s3.04 from the frequency divider.

The charge-pump type low-pass filter is constituted by a charge pump 3.06 and a low-pass filter (3.07 or 3.08) designated by a low-pass filter switching control signal cs3.06. The charge-pump type low-pass filter removes high-frequency components and noise from the output voltage from the phase comparator 3.05, and supplies a DC voltage to the VCO 3.10. In this case, the phase comparison detection gain of the PLL can be adjusted by varying the charge-pump current as follows. That is, a digital value set in the control register 3.17 by the system control unit 1.91 is supplied to a D/A converter 3.09 via a gain control signal line cs3.07. The D/A converter 3.09 converts the digital value into a corresponding current, and the obtained current is supplied to the charge pump 3.06, thereby controlling the charge-pump current.

The response characteristics of the PLL are determined by the filter constant of the low-pass filter 3.07 or 3.08 constituted by a resistor and a capacitor. Therefore, the damping factor of the PLL can be varied by adjusting the phase comparison detection gain and the filter constant.

The VCO 3.10 generates a signal having a frequency corresponding to an integer multiple of that of the reference horizontal synchronization signal s3.02 in accordance with the output signals from a D/A converter 3.11 and the charge pump 3.06 by the following method. That is, a digital value set in the control register 3.17 by the system control unit 1.91 is supplied to the D/A converter 3.1 via an oscillation frequency control signal line cs3.08. A free-run oscillation frequency is determined by the output current from the D/A converter 3.11. The VCO 3.10 can oscillate within a given frequency range having the determined free-run frequency as the center frequency.

On the other hand, a signal corresponding to the difference between the free-run frequency in the frequency range and the oscillation frequency set in the frequency divider 3.04 is output from the charge pump 3.06, and this output signal controls the oscillation frequency of the output signal from the VCO 3.10.

The programmable counter 3.12 frequency-divides the output signal from the VCO 3.10 by a frequency division value set in the control register 3.17 by the system control unit 1.91. The frequency division value set in the control register 3.17 is set in the programmable counter 3.12 via a programmable counter control line cs3.09. The presence of the programmable counter 3.12 allows to obtain an output signal having a frequency lower than the lower limit of the variable frequency range of the VCO 3.10, thus consequently broadening the variable frequency range. Conversely, since the variable frequency range of the VCO 3.10 can be narrowed, the stability of the oscillation frequency of the VCO 3.10 can be improved. The output signal from the programmable counter 3.12 is input to the frequency divider 3.04 and a delay unit 3.13 as the dot clock signal s3.03.

The delay unit 3.13 performs phase adjustment between the dot clock signal s3.03 and the reference horizontal synchronization signal s3.02 for the following reason. That is, the PLL as the basic arrangement of the clock generation unit 1.04 locks the phase difference between the reference horizontal synchronization signal s3.02 and the output signal s3.04 from the frequency divider, but does not adjust it. For this reason, a phase difference is generated between the reference horizontal synchronization signal s3.02 and the dot clock signal s3.03. The delay unit 3.13 adjusts the delay time in accordance with a delay control line cs3.10, thereby adjusting the phase difference between these signals. The delay unit 3.13 will be described in more detail later in the description of the functions of a ½ frequency-division output level switch (output level switch 3.15).

Output level switches 3.14 to 3.16 change the output levels in correspondence with the signal interface level (e.g., TTL, ECL, PECL, or the like) of the connection destination, and the output signal frequency, and switch the output levels in accordance with output control lines cs3.11 to cs3.13.

The output level switch 3.14 receives the dot clock signal s3.03 from the delay unit 3.13, converts it into an ECL-level signal, and outputs its complementary signal cs1.03 to the A/D conversion unit 1.03.

The ½ frequency-division level switch 3.15 receives a dot clock signal s3.03' from the delay unit 3.13 and the reference horizontal synchronization signal s3.02 as a reset signal, and outputs ½ frequency-divided signals level-converted to ECL and TTL.

Figure 8:
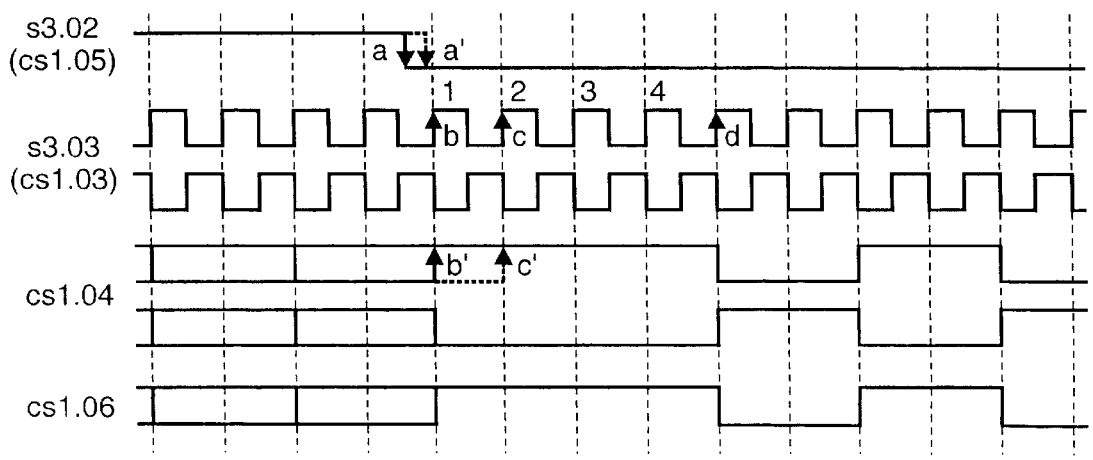
FIG. 8 is a timing chart showing the operation of a ½ frequency-division output level switch 3.15.

FIG. 8 is an operation timing chart of the ½ frequency-division signal level switch 3.15. The Low state of the reset signal s3.02 is detected in synchronism with the leading edge, b, of the dot clock signal s3.03', and signals cs1.04 and cs1.06 are set in the reset state during the next 4-cycle period of the dot clock signal s3.03'. At this time, in order to reliably latch the Low state in synchronism with the leading edge b, a setup time must be allowed for b. Thus, the delay unit 3.13 performs phase adjustment between the reset signal s3.02 and the dot clock signal s3.03 to allow the setup time. Thereafter, the signals cs1.04 and cs1.06 are activated in synchronism with the leading edge, d, of the dot clock signal s3.03'. The ECL complementary signal cs1.04 is output as a demultiplexer signal of the A/D conversion unit 1.03, and the TTL single end signal cs1.06 is output as a master clock signal for the interpolation processing unit 1.05.

The output level switch 3.16 receives the reference horizontal synchronization signal s3.02, converts it into a TTL-level signal, and outputs its single end output signal cs1.05 to the interpolation processing unit 1.05 shown in FIG. 1.

The A/D-converted R, G, and B signals s1.03 are subjected to interpolation processing to have a resolution matching the vertical resolution of the display apparatus 1.5 in the interpolation processing unit 1.05.

Figure 9:
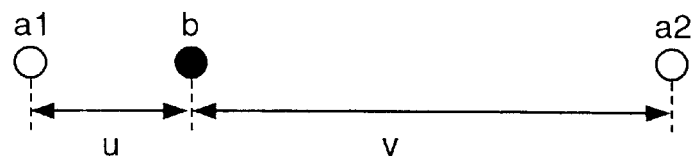
FIG. 9 is a view for explaining an interpolation processing method.

The interpolation processing performed in the interpolation processing unit 1.05 will be described in detail below with reference to FIGS. 9, 10, and 11. As popular interpolation processing methods, a nearest neighbor interpolation method, a linear interpolation (1st-order interpolation method), a cubic convolution interpolation method, and the like are known.

In the nearest neighbor interpolation method, an uninterpolated pixel nearest to the pixel to be interpolated is used as an interpolation pixel. In the linear interpolation method, image data to be interpolated is obtained using image data of pixels on the two sides of the pixel to be interpolated. For example, as shown in FIG. 9, when a pixel b is to be interpolated at a position (between pixels a1 and a2) separated by distances u and v from the pixels a1 and a2 which are aligned at intervals 1, image data of the pixel b is calculated by:

$$b = a1*v/(u+v) + a2/u(u/v) \quad (1)$$

On the other hand, in the cubic convolution interpolation method, image data of the pixel to be interpolated is calculated using image data of two pixels each on the two sides of the pixel to be interpolated, and a cubic convolution function. The cubic convolution function f is given by equation (2) below as a function of a distance t between the pixel to be interpolated and the two pixels each on the two sides of the pixel to be interpolated, which pixels are aligned at intervals 1:

$$f(t) = \sin(\pi t)/(\pi t) \quad (2)$$

Equation (2) is developed as equations (3), (4), and (5) below depending on the range of t:

$$f(t) = 1 - 2*|t|^2 + |t|^3 \quad (0 \leq |t| < 1) \quad (3)$$

$$f(t) = 4 - 8*|t| + 5*|t|^2 - |t|^3 \quad (1 \leq |t| < 2) \quad (4)$$

$$f(t) = 0 \quad (2 \leq |t|) \quad (5)$$

Figure 10:
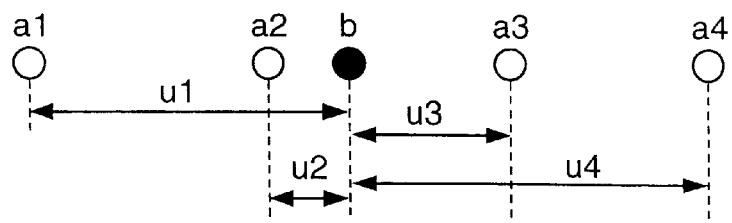
FIG. 10 is a view for explaining an interpolation processing method.
Figure 11:
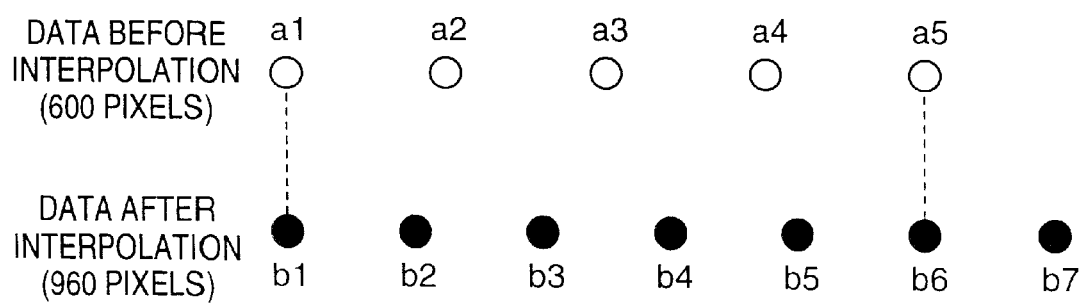
FIG. 11 is a view for explaining an interpolation processing method.

For example, as shown in FIG. 10, when a pixel b is interpolated at a position (between pixels a2 and a3) separated by distances u1, u2, u3, and u4 from pixels a1, a2, a3, and a4 aligned at intervals 1, image data of the pixel b is calculated by equation (6) below using the cubic convolution function f:

$$b = a1*(4-8*u1+5*u1^2-u1^3) + a2*(1-2*u2^2+u2^3) + a3*(1-2*u3^2+u3^3) + a4*(4-8*u4+5*u4^2-u4^3) \quad (6)$$

A case will be exemplified below with reference to FIG. 11 wherein the interpolation processing from, e.g., 768 pixels to 960 pixels on the basis of the linear interpolation method (1st-order interpolation method) and the cubic convolution interpolation method using equations (1) and (6). In this case, eight interpolated data are formed based on five data before interpolation. For this purpose, image data bn obtained by the linear interpolation method and interpolated image data bn obtained by the cubic convolution interpolation method are respectively given by equations (7) and (8) below using image data an before interpolation:

$$b5n+1 = a4n+1 \quad (n=0, 1, 2, \ldots)$$

$$b5n+2 = (4/5)*a4n+1 + (1/5)*a4n+2$$

$$b5n+3 = (3/5)*a4n+2 + (2/5)*a4n+3$$

$$b5n+4 = (2/5)*a4n+3 + (3/5)a4(n+1)$$

$$b5n+5 = (1/5)*a4(n+1) + (4/5)*a4(n+1)+1 \quad (7)$$

$$b5n+1 = a4n+1 \quad (n=0, 1, 2, \ldots)$$

$$b5n+2 = (-4/125)*a4n + (29/125)*a4n+1 + (116/125)*a4n+2 + (-16/125)*a4n+3$$

$$b5n+3 = (-12/125)*a4n+1 + (62/125)*a4n+2 + (93/125)*a4n+3 + (-18/125)*a4(n+1)$$

$$b5n+4 = (-18/125)*a4n+2 + (93/125)*a4n+3 + (62/125)*a4(n+1) + (-12/125)*a4(n+1)+1$$

$$b5(n+1) = (-16/125)*a4n+3 + (116/125)*a4(n+1) + (29/125)*a4(n+1)+1 + (-4/125)*a4(n+1)+2 \quad (8)$$

However, when the interpolation processing based on the linear interpolation method or the cubic convolution interpolation method using equations (7) or (8) is realized by a hardware circuit (ASIC), an impractical circuit scale is required since complicated fraction calculations must be performed.

In view of this problem, in the display control apparatus of this embodiment, in order to realize the interpolation processing based on the linear interpolation method or the cubic convolution interpolation method by a small-scale hardware circuit (ASIC), the coefficients of equations (7) and (8) above are subjected to approximation using the sum of exponents of 2. Equations (9) and (10) below are the approximation results of equations (7) and (8) above.

$$b5n+1 = a4n+1 \quad (n=0, 1, 2, \ldots)$$

$$b5n+2 = (1/2+1/4)*a4n+1 + (1/4)*a4n+2$$

$$b5n+3 = (1/2+1/8)*a4n+2 + (1/4+1/8)*a4n+3$$

$$b5n+4 = (1/4+1/8)*a4n+3 + (1/2+1/8)*a4(n+1)$$

$$b5n+5 = (1/4)*a4(n+1) + (1/2+1/4)*a4(n+1)+1 \quad (9)$$

$$b5n+1 = a4n+1 \quad (n=0, 1, 2, \ldots)$$

$$b5n+2 = (-1/16)*a4n + (1/4)*a4n+1 + (1/2+1/4+1/8+1/16)*a4n+2 + (-1/8)*a4n+3$$

$$b5n+3 = (-1/8)*a4n+1 + (1/2)*a4n+2 + (1/2+1/4)*a4n+3 + (-1/8)*a4(n+1)$$

$$b5n+4 = (-1/8)*a4n+2 + (1/2+1/4)*a4n+3 + (1/2)*a4(n+1) + (-1/8)*a4(n+1)+1$$

$$b5(n+1) = (-1/8)*a4n+3 + (1/2+1/4+1/8+1/16)*a4(n+1) + (1/4)*a4(n+1)+1 + (-1/16)*a4(n+1)+2 \quad (10)$$

Approximation from equation (7) to equation (9) is attained so that the number of coefficient terms can be reduced as much as possible and the maximum approximation error falls within 1/20. On the other hand, approximation from equation (8) to equation (10) is also attained so that the number of coefficient terms can be reduced as much as possible and the maximum approximation error falls within 1/32. If deterioration of image quality caused by the interpolation processing is to be minimized, terms smaller than $1/64$ are added to further reduce the maximum approximation error. On the contrary, if the hardware circuit scale (ASIC) is to be reduced, smaller terms such as $1/64$, $1/32$, and the like are omitted although the approximation error increases.

Similarly, equations (11) below represent the approximation result of the linear interpolation method, and equations (12) below represent the approximation result of the cubic convolution interpolation method upon interpolation from 480 pixels to 960 pixels:

$$b2n+1 = an+1 (n=0, 1, 2 \ldots)$$

$$b2(n+1) = (1/2)*an+1+(1/2)*an+2 \quad (11)$$

$$b2n+1 = an+1 (n=0, 1, 2 \ldots)$$

$$b2(n+1) = (-1/8)*an+(1/2+1/8)*an+1+(1/2+1/8)*an+2+(-1/8)*an+3 \quad (12)$$

Furthermore, similarly, equations (13) below represent the approximation result of the linear interpolation method, and equations (14) below represent the approximation result of the cubic convolution interpolation method upon interpolation from 600 pixels to 960 pixels:

$$b8n+1 = a5n+1 (n=0, 1, 2, \ldots)$$

$$b8n+2 = (1/2+1/8)*a5n+1+(1/4+1/8)*a5n+2$$

$$b8n+3 = (1/4)*a5n+2+(1/2+1/4)*a5n+3$$

$$b8n+4 = (1/2+1/4+1/8)*a5n+2+(1/8)*a5n+3$$

$$b8n+5 = (1/2)*a5n+3+(1/2)*a5n+4$$

$$b8n+6 = (1/8)*a5n+4+(1/2+1/4+1/8)*a5(n+1)$$

$$b8n+7 = (1/2+1/4)*a5n+4 + (1/4)*a5(n+1)$$

$$b8(n30\ 1) = (1/4+1/8)*a5(n+1)+(1/2+1/8)*a5(n+1)+1 \quad (13)$$

$$b8n+1 = a5n+1 (n=0, 1, 2, \ldots)$$

$$b8n+2 = (-1/16+-1/32)*a5n+(1/4+1/8+1/16+1/32)*a5n+1+(1/2+1/4)*a5n+2+(-1/8)*a5n+3$$

$$b8n+3 = (-1/8)*a5n+1+(1/2+1/4+1/8)*a5n+2+(1/4+1/32)*a5n+3+(-1/32)*a5n+4$$

$$b8n+4 = (-1/64)*a5n+1+(1/8+1/64)*a5n+2+(1/2+1/4+1/8+1/16+1/32)*a5n+3+(-1/16+-1/32)*a5n+4$$

$$b8n+5 = (-1/8)*a5n+2+(1/2+1/8)*a5n+3+(1/2+1/8)*a5n+4+(-1/8)*a5(n+1)$$

$$b8n+6 = (-1/16+-1/32)*a5n+3+(1/2+1/4+1/8+1/16+1/32)*a5n+4+(1/8+1/64)*a5(n+1)+(-1/64)*a5(n+1)+1$$

$$b8n+7 = (-1/32)*a5n+3+(1/4+1/32)*a5n+4+(1/2+1/4+1/8)*a5(n+1)+(-1/8)*a5(n+1)+1$$

$$b8(n+1) = (-1/8)*a5n+4+(1/2+1/4)*a5(n+1)+(1/4+1/8+1/16+1/32)*a5(n+1)++1+(-1/16+-1/32)a5(n+1)+2 \quad (14)$$

In order to obtain the coefficients of approximation formulas (9) to (14) above, a calculation for obtaining image data by adding the respective shifts corresponding to the number of effective bits (6 bits in this embodiment) from 0 of shift image data is performed. This calculation is called a shift calculation.

Figure 12:
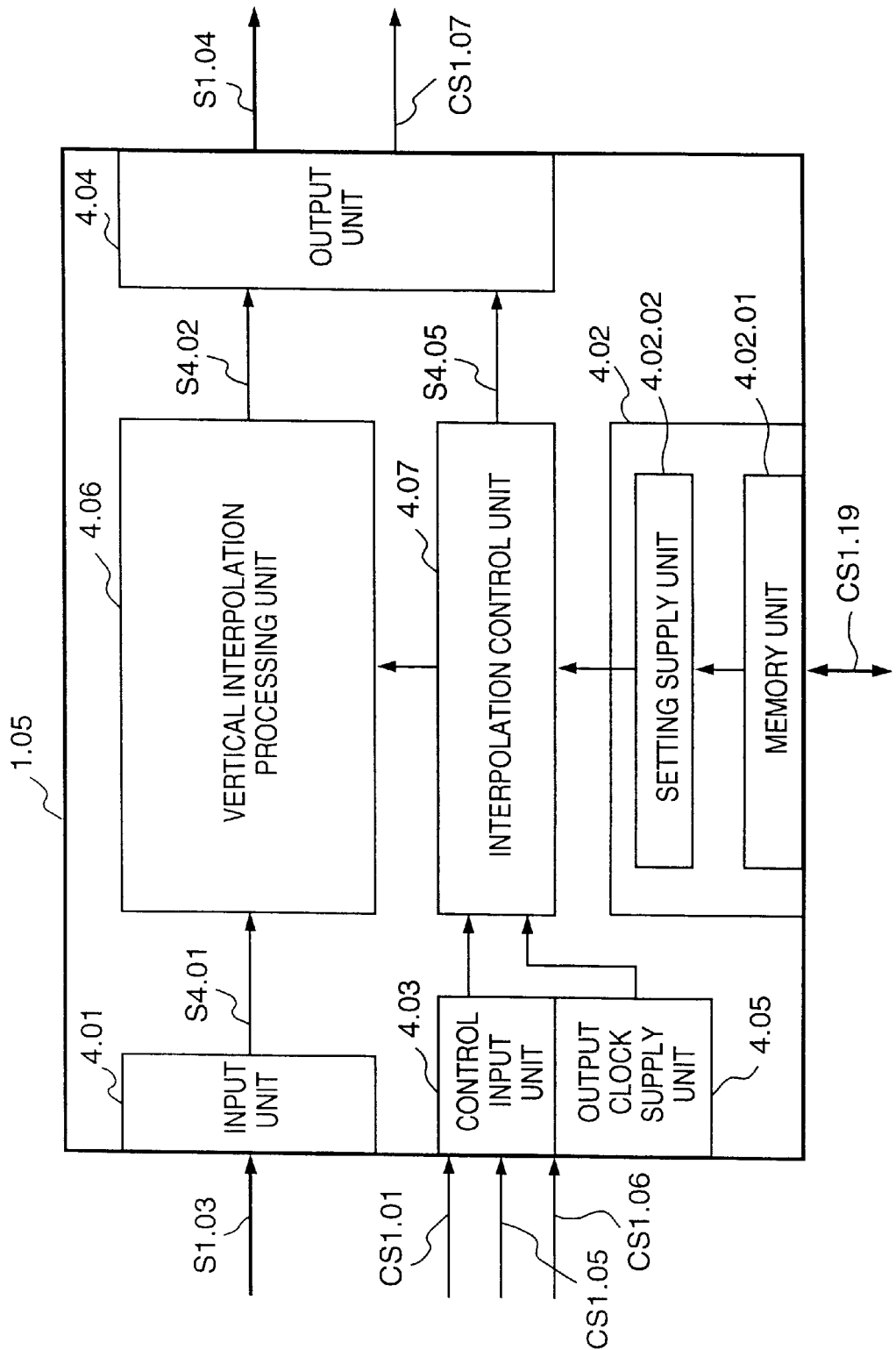
FIG. 12 is a detailed block diagram of a vertical interpolation unit 1.05 for performing vertical interpolation and enlargement display on a dot matrix display of input effective display image data.

Next, an example of the hardware arrangement of the interpolation processing unit 1.05 will be described in detail below with reference to FIG. 12. FIG. 12 is a block diagram showing the arrangement of a vertical interpolation unit 1.05 for performing vertical interpolation of input effective display image data and displaying the interpolated image data on the dot matrix display in an enlarged scale.

Referring to FIG. 12, reference numeral 4.01 denotes an input unit which receives digital image data as an output from the A/D conversion unit 1.03. Reference numeral 4.02 denotes a control input unit which receives a control signal for controlling the interpolation processing unit 1.05 from the system control unit 1.91. Reference numeral 4.02.01 denotes a memory unit for storing setting data set by the system control unit 1.05. Reference numeral 4.02.02 denotes a setting supply unit for supplying the stored setting data to another processing apparatus.

Reference numeral 4.03 denotes a synchronization input unit (or control input unit) for receiving a clock signal and a synchronization signal. Reference numeral 4.04 denotes an output unit for outputting image data s1.04 and a synchronization signal cs1.07 to a digital processing unit 1.4. Reference numeral 4.05 denotes an output clock supply unit which determines the transfer rate at which the output unit 4.04 outputs the image data. Reference numeral 4.06 denotes a vertical interpolation processing unit which performs digital processing for input image data to increase the number of horizontal lines. Reference numeral 4.07 denotes an interpolation control unit for controlling the vertical interpolation processing unit 4.06.

In the above arrangement, the input unit 4.01 supplies image data, which is output from the A/D conversion unit 1.03 and is received via a data signal line s1.03, to the vertical interpolation processing unit 4.06 in synchronism with the respective signals input to the synchronization input unit 4.03. The setting data stored in the memory unit 4.02.01 in the control input unit 4.02 is supplied to the interpolation control unit 4.07 via the setting supply unit 4.02.02. The processing is performed based on the supplied setting data, and the output unit 4.04 outputs image data to a switch unit 1.06 shown in FIG. 1 in synchronism with the clock signal supplied from the output clock supply unit 4.05. On the other hand, when no vertical interpolation processing is performed, the output unit 4.04 outputs image data to the switch unit 1.06 using the clock signal supplied from the synchronization input unit 4.03.

Figure 13:
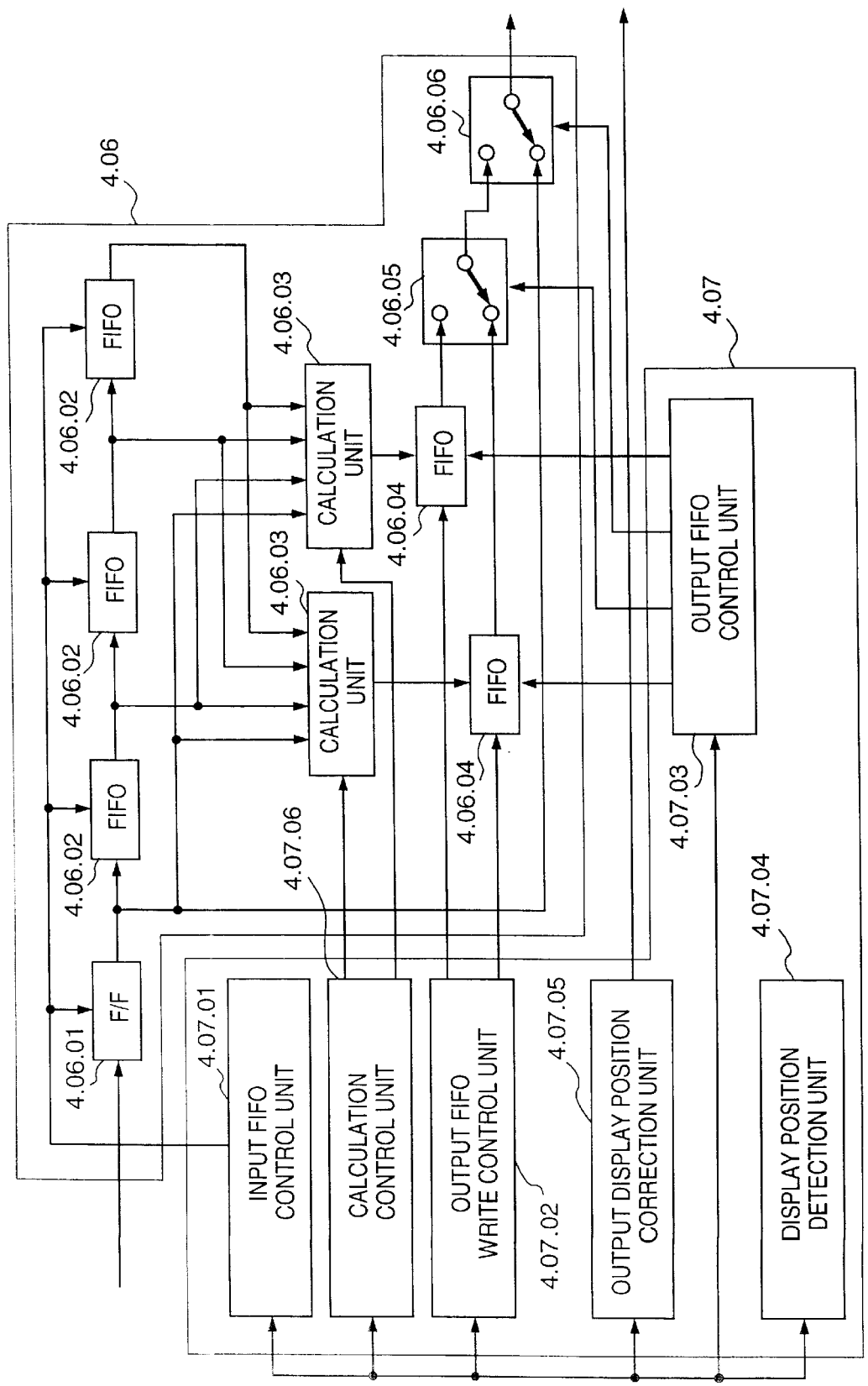
FIG. 13 is a block diagram for explaining in detail an interpolation processing unit 4.06 and an interpolation control unit 4.07 shown in FIG. 12.

FIG. 13 is a block diagram for explaining the details of the vertical interpolation processing unit 4.06 and the interpolation control unit 4.07 shown in FIG. 12.

Referring to FIG. 13, reference numeral 4.06.01 denotes a flip-flop (F/F) circuit for attaining synchronization between image data and a synchronization signal; 4.06.02, input FIFO memories for storing a horizontal line; and 4.06.03, calculation units for calculating input image data using interpolation coefficients. Reference numeral 4.06.04 denotes output FIFO memories for storing image data after the interpolation calculations. Reference numeral 4.06.05 denotes a switch unit for selecting the outputs from the output FIFO memories 4.06.04 and transferring the selected outputs to a switch unit 4.06.06. The switch unit 4.06.06 selects one of through data when the interpolation coefficients are 1, i.e., when no interpolation is performed, and data input from the switch unit 4.06.05.

Reference numeral 4.07.01 denotes an input FIFO control unit for controlling the input timings of image data, and the read and write timings of data from and to the FIFO memories 4.06.02. Reference numeral 4.07.02 denotes an output FIFO write control unit for controlling the timings of the calculation units 4.06.03 and the write timings of the FIFO memories 4.06.04. Reference numeral 4.07.03 denotes an output FIFO control unit for controlling the read timings of the output FIFO memories 4.06.04. Reference numeral 4.07.04 denotes a display position detection unit for detecting the display start position. Reference numeral 4.07.05 denotes a position correction unit for adjusting the timings between the image data output from the interpolation processing unit 1.05 and a synchronization signal. Reference numeral 4.07.06 denotes a calculation control unit for controlling exponents in units of lines.

In the above arrangement, input image data is synchronized with a signal supplied from the input FIFO control unit 4.07.01 in the F/F circuit 4.06.01, and is then transferred to the FIFO memories 4.06.02.

The FIFO memories 4.06.02 are controlled by the input FIFO control unit 4.07.01 so that image data delayed by one horizontal line are sequentially transferred thereto. The calculation units 4.06.03 receive image data of the same column of the horizontal lines in accordance with a control signal from the calculation control unit 4.07.06, and generate vertical interpolated lines. The generated vertical interpolated lines are stored in the FIFO memories 4.06.04 on the basis of a signal from the output FIFO control unit 4.07.03. The stored image data are read out in response to a signal from the output FIFO control unit 4.07.03, and are transferred to the switch unit 1.06 via the switch units 4.06.05 and 4.06.06. Upon transfer of image data, the output display position correction unit 4.07.05 generates and outputs a signal synchronous with the image data.

When the system control unit 1.91 determines based on the measurement results of the synchronization measurement unit 1.02 that the number of lines of an input signal matches that of the display apparatus 1.5, it switches the switch unit 4.06.06 to directly output image data so as not to perform interpolation processing by the interpolation processing unit 1.05.

According to this embodiment, the interpolation processing unit 4.06 can interpolate data up to a maximum of lines twice the original number of lines by the interpolation processing in the vertical direction since the FIFO memories 4.06.02 and 4.06.04 and the calculation units 4.06.03 are arranged, as shown in FIG. 13. When a plurality of interpolation processing units equivalent to the interpolation processing unit 4.06 are arranged, the number of lines that can be obtained by interpolation can be increased.

Figure 14:
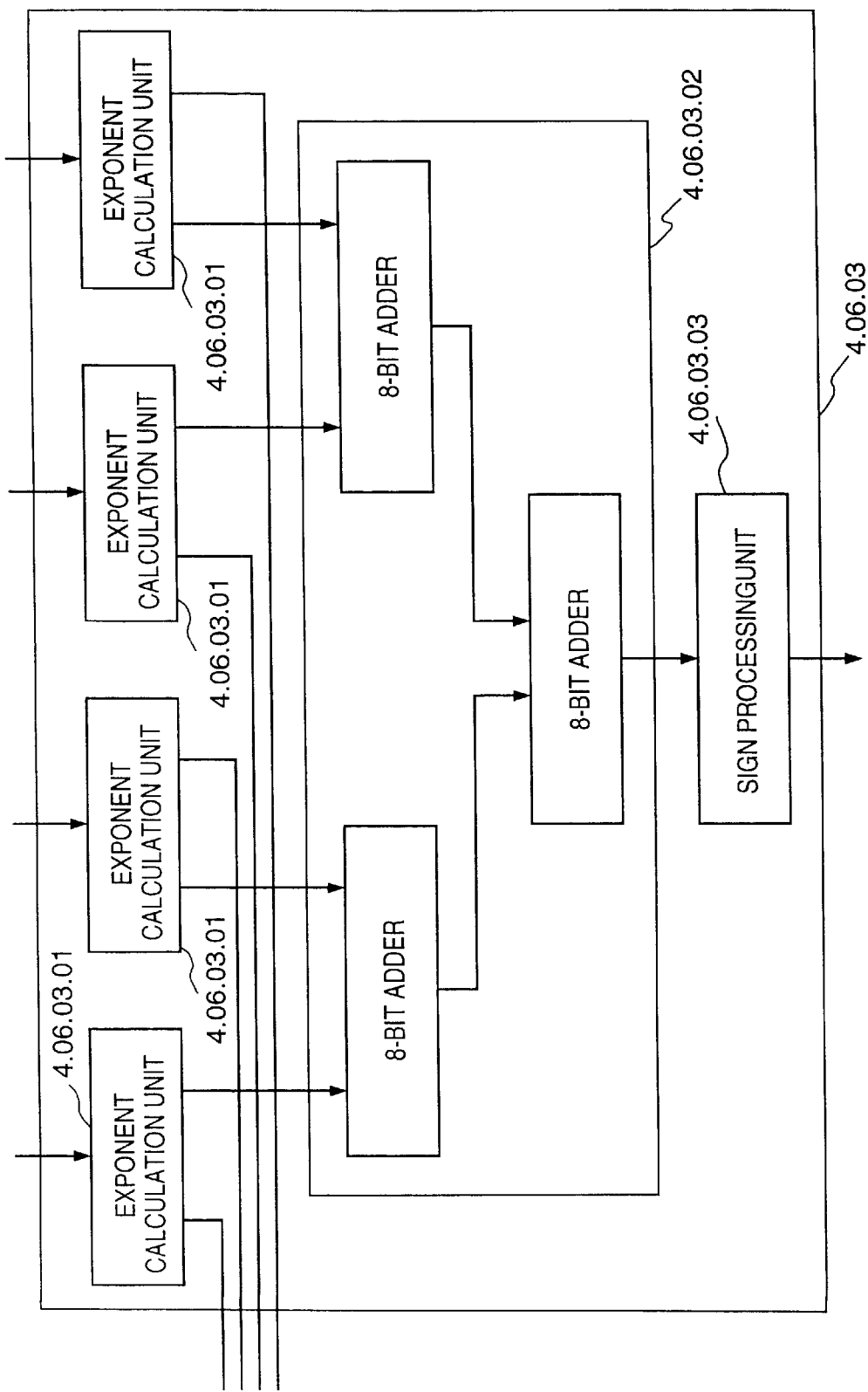
FIG. 14 is a block diagram showing the arrangement of a calculation unit 4.06.03 for input image data.

FIG. 14 is a block diagram showing the arrangement of the calculation unit 4.06.03 for input image data.

Referring to FIG. 14, exponent calculation units 4.06.03.01 receive image data of the respective lines from the F/F circuit 4.06.01 or the input FIFO memories 4.06.02, and multiply the input data with their predetermined exponents. The units 4.06.03.01 transfer the product image data to a 4-input adder 4.06.03.02, which adds the input data. The adder 4.06.03.02 supplies the sum image data to a sign processing unit 4.06.03.03. When the calculation result assumes a negative value, the unit 4.06.03.03 replaces the input data by a minimum value "00" (6 bits; a hexadecimal value). On the other hand, when the calculation result exceeds a maximum value, the unit 4.06.03.03 replaces the input data by a maximum value "3F" (6 bits; a hexadecimal value).

Figure 15:
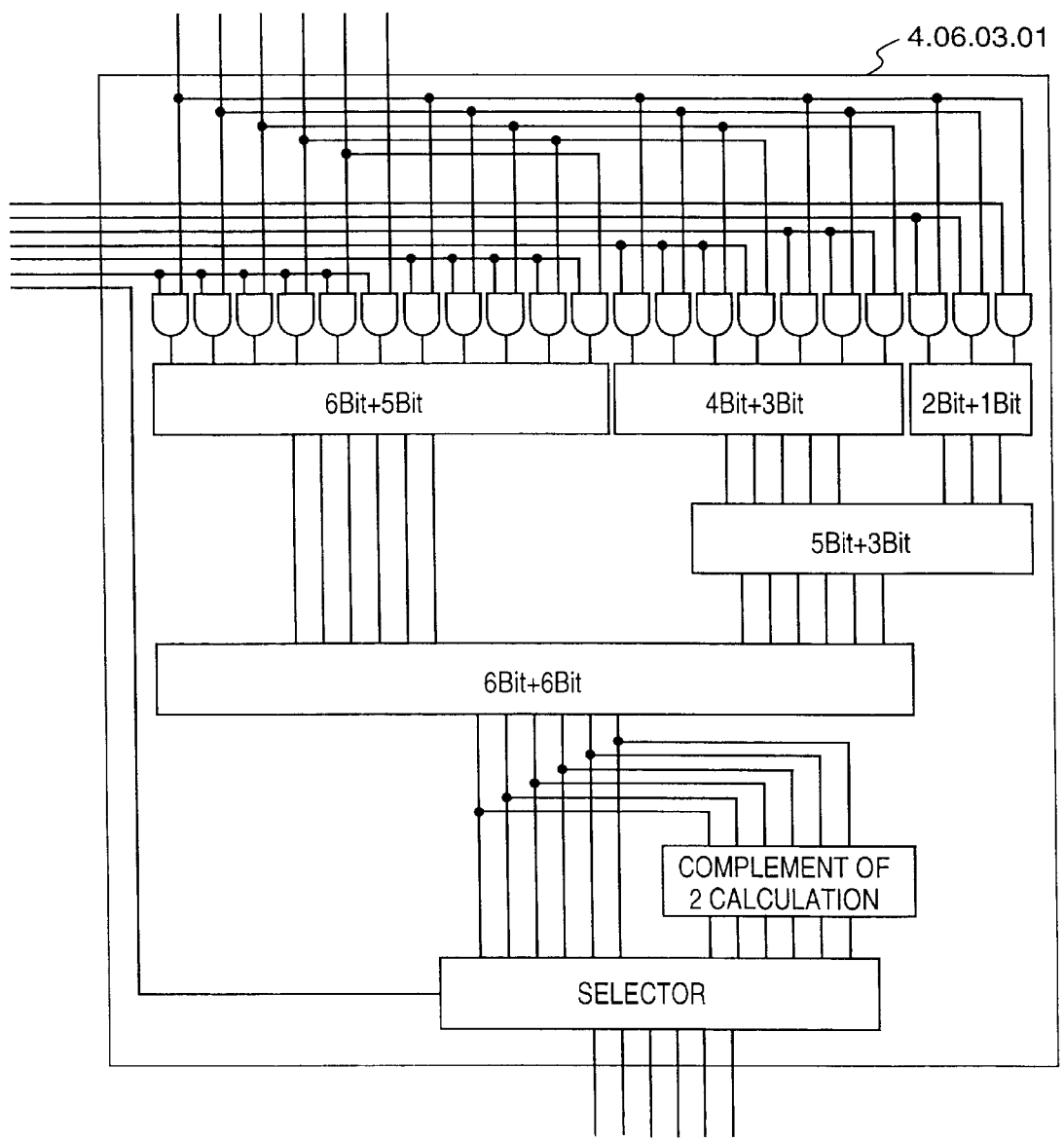
FIG. 15 is a detailed block diagram of an exponent calculation unit 4.06.03.01.

FIG. 15 is a detailed block diagram of the exponent calculation unit 4.06.03.01.

Referring to FIG. 15, values obtained by multiplying input image data with $1/32$ to $32/32$ are generated. A complement of 2 calculator 4.06.03b selects image data obtained with and without going through a complement of 2 calculator 4.06.03a, and transfers the image data to the 4-input adder 4.06.03.02.

Figure 16:
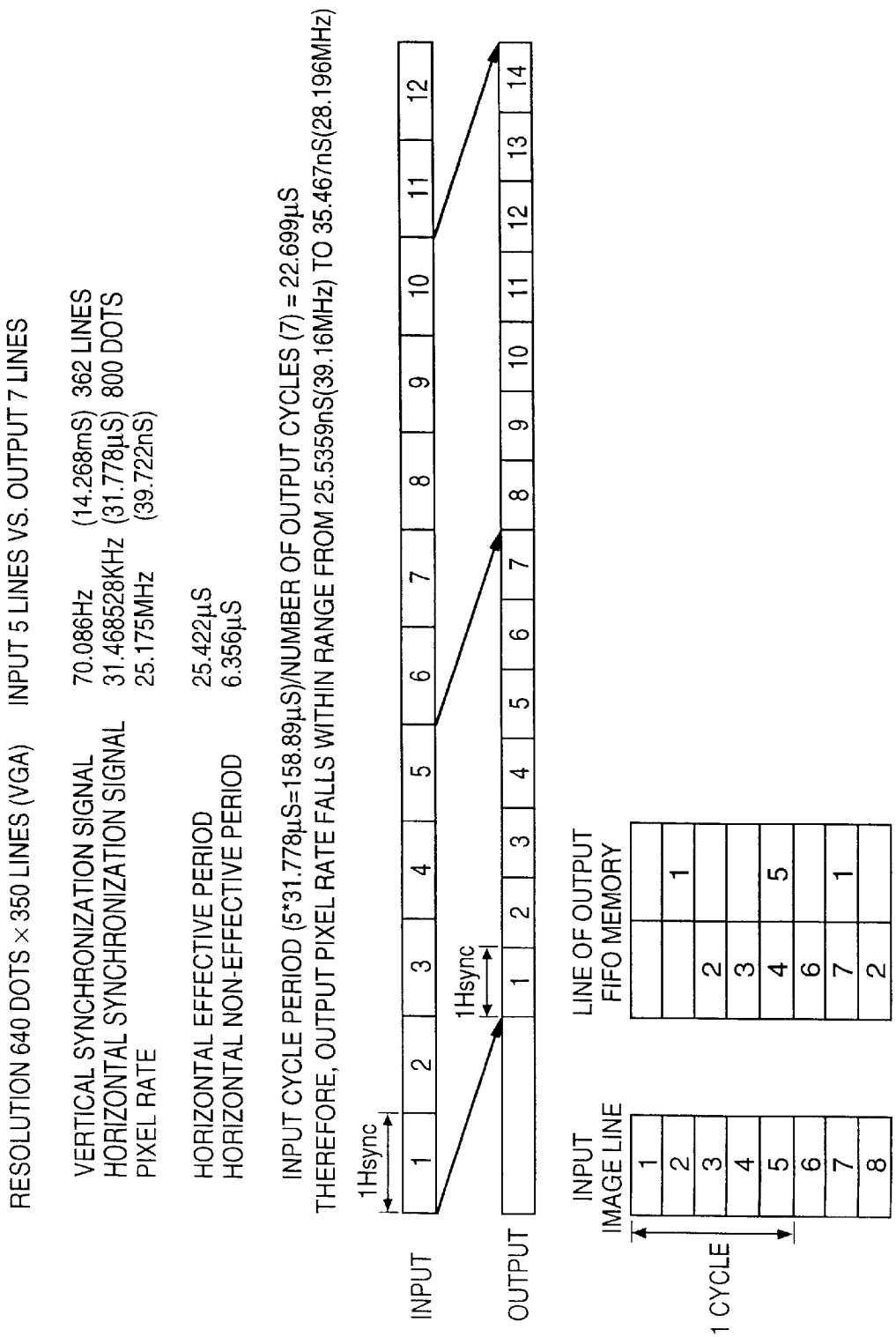
FIG. 16 is a view for explaining a schematic operation for attaining vertical interpolation processing in the case of 640 dots (horizontal)×350 lines (vertical)

FIG. 16 is a view for explaining a schematic operation for attaining vertical interpolation processing in the case of 640 dots (horizontal)×350 lines (vertical) as one display mode of a VGA as a graphics card available from IBM Corporation. In an input image signal in this case, an effective image in the horizontal direction has 640 dots. The horizontal effective pixel period is sampled 1,280 times to enlarge the horizontal dots to 1,280 dots. Consequently, 640-dot image data is sampled twice per dot. On the other hand, the number of vertical lines is increased from 350 to 490 by the vertical interpolation processing of the interpolation processing unit 1.05. Furthermore, 2-line enlargement is performed in the display apparatus 1.5 to increase the number of vertical lines to 980 defined by an approximate aspect ratio. Then, the display apparatus 1.5 performs a display operation on a 1,280 dots (horizontal)×980 lines (vertical) effective display area.

In the interpolation processing, when image data is input at timings described in FIG. 16, the period required for inputting one horizontal line is 31.778 μs, and effective image data is included in 25.422 μs of this input period. In this vertical interpolation processing, seven output lines must be formed with respect to five input lines. Therefore, as indicated by an equation in FIG. 16, the output period is determined to be 22.699 μs. Furthermore, the output cycle is determined in terms of the effective data period. In this case, the output cycle is determined to fall within the range from 39.16 MHz to 28.196 MHz. In the relationship between the input and output timings, the output must be started after two lines are input, and seven lines must be output while five lines are input. FIG. 16 shows the relationship between the input lines and the FIFO memories 4.06.04. When lines with cycle numbers of input lines in the left table in FIG. 16 are input, lines with cycle line numbers described in the right table in FIG. 16 are controlled to be input to the FIFO memories 4.06.04.

In FIG. 16, the output pixel rate has a value obtained by dividing the one-line period not by 1,280 but by 640. This is for the following reason. When the resolution is as high as 1,280×1,024, the transfer speed of image data is about 135 MHz, which is very difficult to attain for a currently available semiconductor logic, resulting in a very expensive circuit. In view of this problem, the A/D conversion unit 1.03 lowers the data transfer speed to ½, and data for two pixels are simultaneously transferred as the R, G, and B signals s1.23, thus allowing low-speed processing in the interpolation processing unit 1.05 and the digital processing unit 1.4. Also, since ICs can be divided, a reduction of heat generation and consumption power and a size reduction of each IC can be realized, thus reducing cost.

Figure 17:
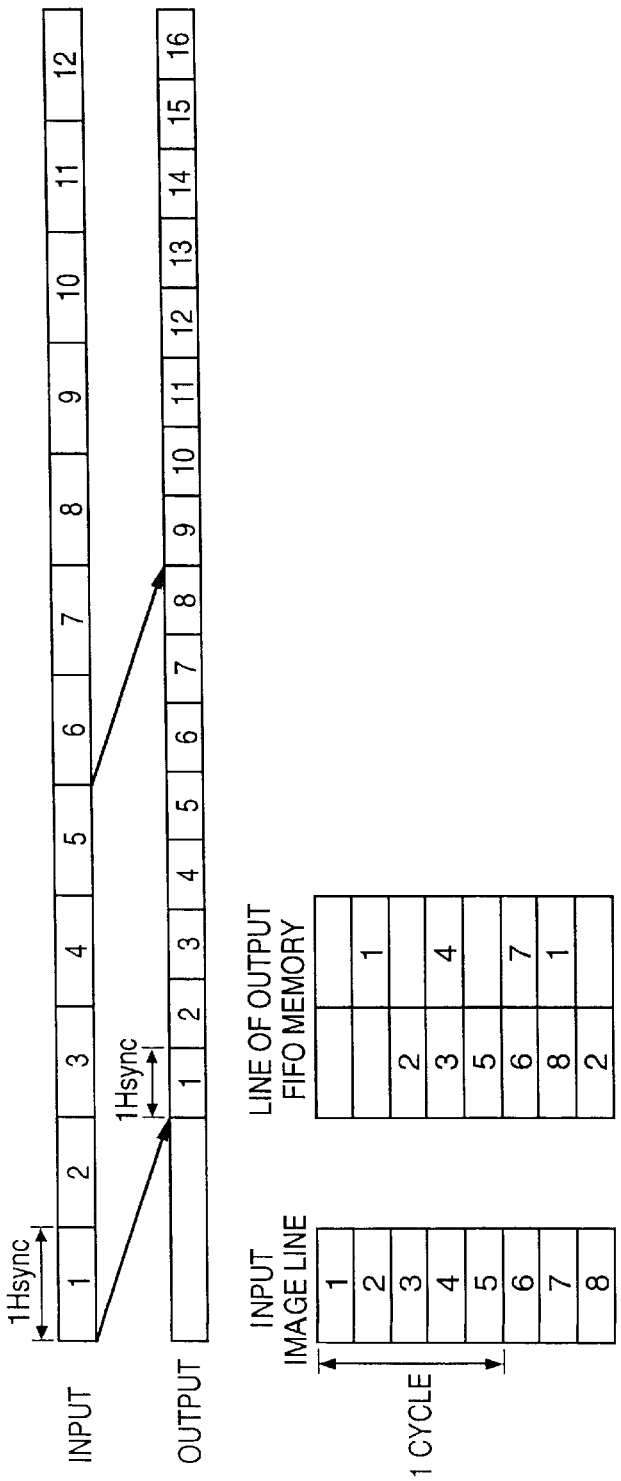
FIG. 17 is a view for explaining a schematic operation for attaining vertical interpolation processing in the case of 800 dots (horizontal)×600 lines (vertical) in the VESA standard.

FIG. 17 is a view for explaining a schematic operation for attaining vertical interpolation processing in the case of 800 dots (horizontal)×600 lines (vertical) in the VESA standard. In this case, an 800-dot horizontal effective pixel period in an input image signal is sampled 1,280 times to enlarge the horizontal dots to 1,280 dots. On the other hand, the number of vertical lines is increased from 600 to 960, defined by an approximate aspect ratio, by the vertical interpolation processing of the interpolation processing unit 1.05. As a result, the display apparatus 1.5 performs a display operation on a 1,280 dots (horizontal)×960 lines (vertical) effective display area.

In the interpolation processing, when image data is input at timings described in FIG. 17, the period required for inputting one horizontal line is 28.444 μs, and effective image data is included in 22.222 μs of this input period. In this vertical interpolation processing, eight output lines must be formed with respect to five input lines. Therefore, as indicated by an equation in FIG. 17, the output period is determined to be 17.778 µs. Furthermore, the output cycle is determined in terms of the effective data period. In this case, the output cycle is determined to fall within the range from 55.385 MHz to 36.000 MHz. In the relationship between the input and output timings, the output must be started after two lines are input, and eight lines must be output while five lines are input. FIG. 17 shows the relationship between the input lines and the FIFO memories 4.06.04. When lines with cycle numbers of input lines in the left table in FIG. 17 are input, lines with cycle line numbers described in the right table in FIG. 17 are controlled to be input to the FIFO memories 4.06.04.

FIG. 18 is a view for explaining a schematic operation for attaining vertical interpolation processing in the case of 800 dots (horizontal)×600 lines (vertical) in the VESA standard. In this case, an 800-dot horizontal effective pixel period in an input image signal is sampled 1,280 times to enlarge the horizontal dots to 1,280 dots. On the other hand, the number of vertical lines is increased from 600 to 960, defined by an approximate aspect ratio, by the vertical interpolation processing of the interpolation processing unit 1.05. Then, the display apparatus 1.5 performs a display operation on a 1,280 dots (horizontal)×960 lines (vertical) effective display area.

In the interpolation processing, when image data is input at timings described in FIG. 18, the period required for inputting one horizontal line is 26.400 µs, and effective image data is included in 20.000 µs of this input period. In this vertical interpolation processing, eight output lines must be formed with respect to five input lines. Therefore, as indicated by an equation in FIG. 18, the output period is determined to be 16.500 µs. Furthermore, the output cycle is determined in terms of the effective data period. In this case, the output cycle is determined to fall within the range from 63.3663 MHz to 38.7878 MHz. In the relationship between the input and output timings, the output must be started after two lines are input, and eight lines must be output while five lines are input. FIG. 18 shows the relationship between the input lines and the FIFO memories 4.06.04. When lines with cycle numbers of input lines in the left table in FIG. 18 are input, lines with cycle line numbers described in the right table in FIG. 18 are controlled to be input to the FIFO memories 4.06.04.

Figure 19:
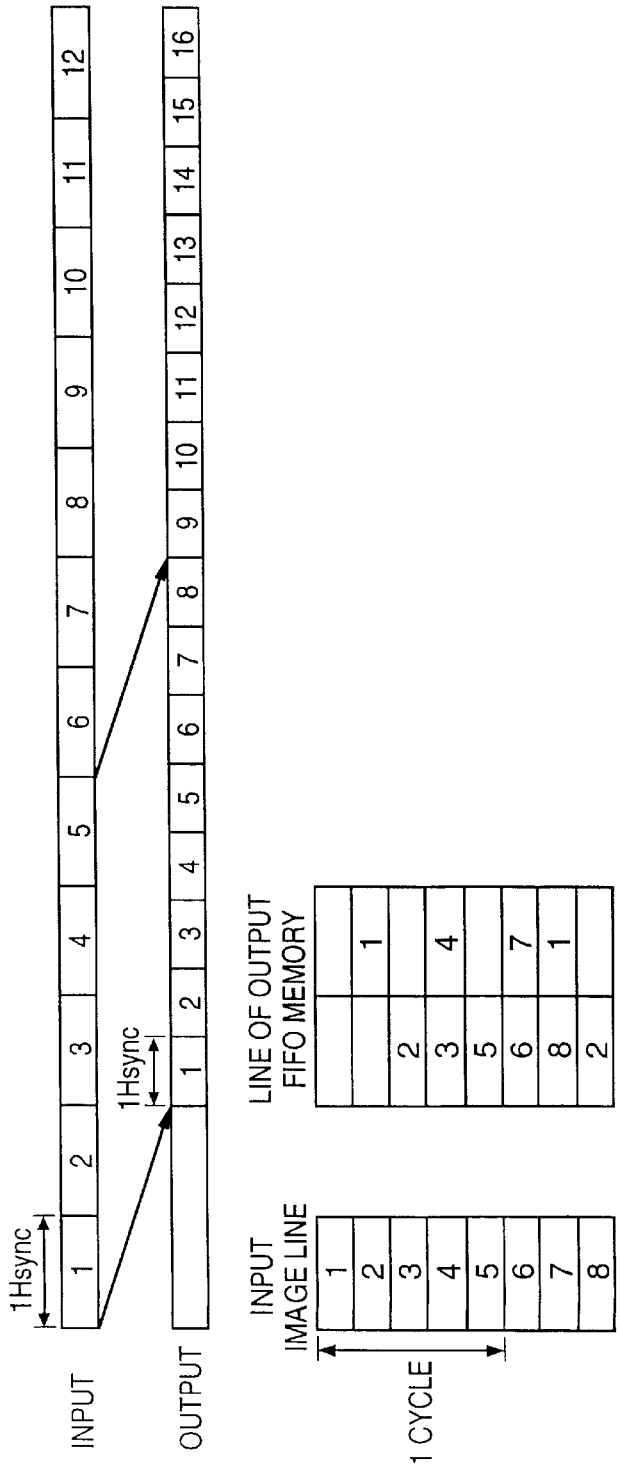
FIG. 19 is a view for explaining a schematic operation for attaining vertical interpolation processing in the case of 800 dots (horizontal)×600 lines (vertical) in the VESA standard.

FIG. 19 is a view for explaining a schematic operation for attaining vertical interpolation processing in the case of 800 dots (horizontal)×600 lines (vertical) in the VESA standard. In this case, an 800-dot horizontal effective pixel period in an input image signal is sampled 1,280 times to enlarge the horizontal dots to 1,280 dots. On the other hand, the number of vertical lines is increased from 600 to 960, defined by an approximate aspect ratio, by the vertical interpolation processing of the interpolation processing unit 1.05. As a consequence, the display apparatus 1.5 performs a display operation on a 1,280 dots (horizontal)×960 lines (vertical) effective display area.

In the interpolation processing, when image data is input at timings described in FIG. 19, the period required for inputting one horizontal line is 20.800 µs, and effective image data is included in 16.000 µs of this input period. In this vertical interpolation processing, eight output lines must be formed with respect to five input lines. Therefore, as indicated by an equation in FIG. 19, the output period is determined to be 13.000 µs. Furthermore, the output cycle is determined in terms of the effective data period. In this case, the output cycle is determined to fall within the range from 78.048 MHz to 49.231 MHz. In the relationship between the input and output timings, the output must be started after two lines are input, and eight lines must be output while five lines are input. FIG. 19 shows the relationship between the input lines and the FIFO memories 4.06.04. When lines with cycle numbers of input lines in the left table in FIG. 19 are input, lines with cycle line numbers described in the right table in FIG. 19 are controlled to be input to the FIFO memories 4.06.04.

Figure 20:
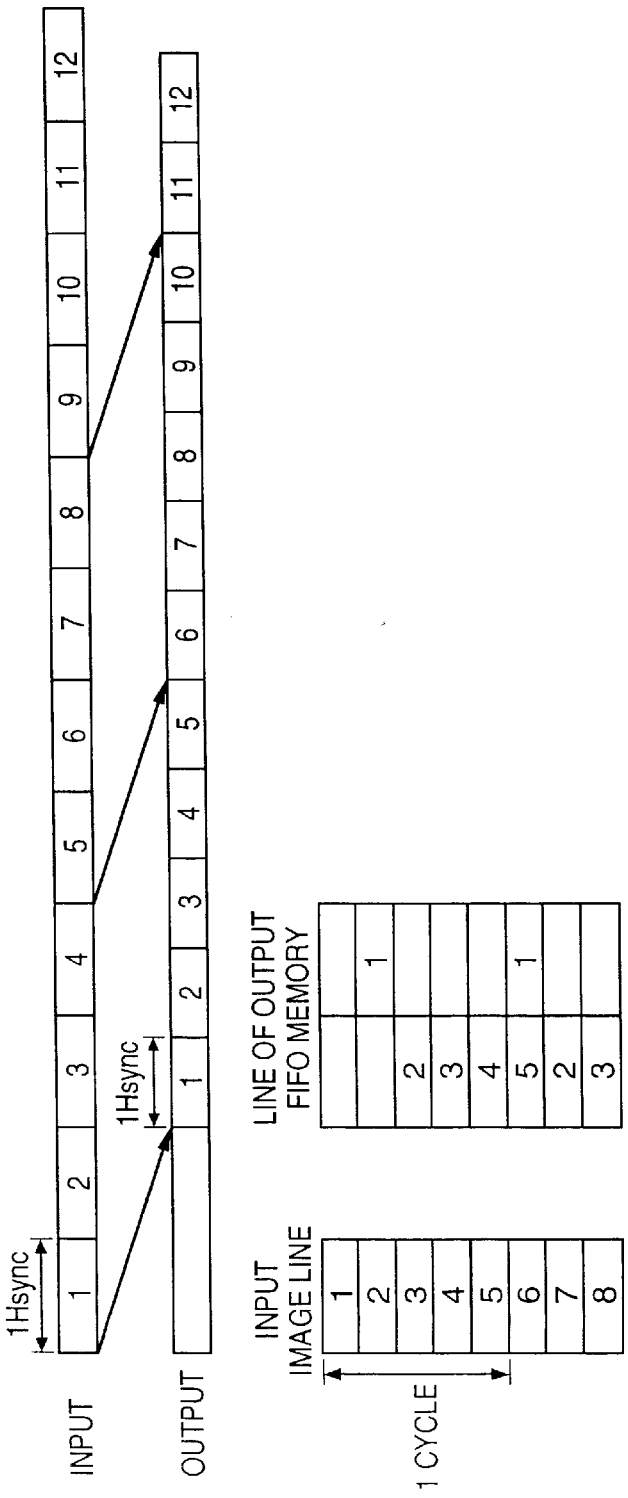
FIG. 20 is a view for explaining a schematic operation for attaining vertical interpolation processing in the case of 1,024 dots (horizontal)×768 lines (vertical) in the VESA standard.

FIG. 20 is a view for explaining a schematic operation for attaining vertical interpolation processing in the case of 1,024 dots (horizontal)×768 lines (vertical) in the VESA standard. In this case, a 1,024-dot horizontal effective pixel period in an input image signal is sampled 1,280 times to enlarge the horizontal dots to 1,280 dots. on the other hand, the number of vertical lines is increased from 768 to 960, defined by an approximate aspect ratio, by the vertical interpolation processing of the interpolation processing unit 1.05. Then, the display apparatus 1.5 performs a display operation on a 1,280 dots (horizontal)×960 lines (vertical) effective display area.

In the interpolation processing, when image data is input at timings described in FIG. 20, the period required for inputting one horizontal line is 17.707 µs, and effective image data is included in 13.653 µs of this input period. In this vertical interpolation processing, five output lines must be formed with respect to four input lines. Therefore, as indicated by an equation in FIG. 20, the output period is determined to be 14.1656 µs. Furthermore, the output cycle is determined in terms of the effective data period. In this case, the output cycle is determined to fall within the range from 63.2 MHz to 45.2 MHz. In the relationship between the input and output timings, the output must be started after two lines are input, and five lines must be output while four lines are input. FIG. 20 shows the relationship between the input lines and the FIFO memories 4.06.04. When lines with cycle numbers of input lines in the left table in FIG. 20 are input, lines with cycle line numbers described in the right table in FIG. 20 are controlled to be input to the FIFO memories 4.06.04.

Figure 21:
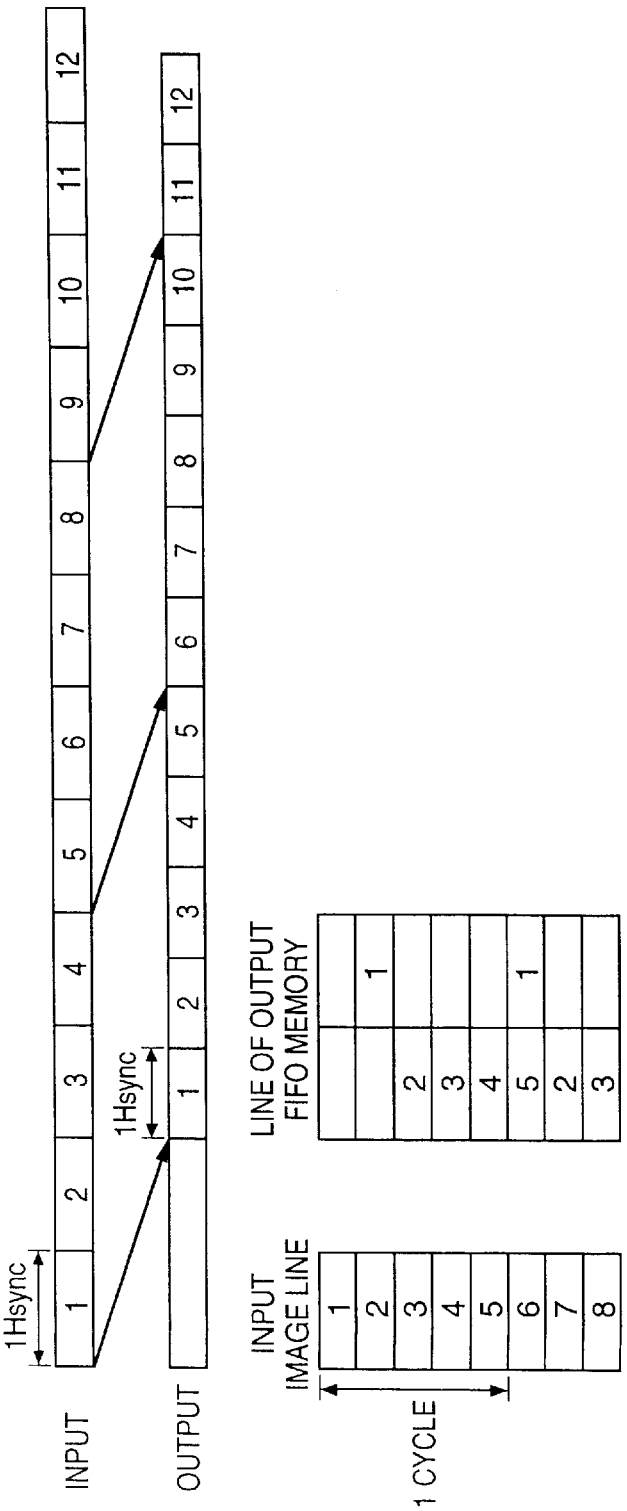
FIG. 21 is a view for explaining a schematic operation for attaining vertical interpolation processing in the case of 1,024 dots (horizontal)×768 lines (vertical) as one display mode of a Macintosh (tradename) series computer available from Apple Computer Inc.

FIG. 21 is a view for explaining a schematic operation for attaining vertical interpolation processing in the case of 1,024 dots (horizontal)×768 lines (vertical) in one display mode of a Macintosh series computer available from Apple Computer Inc. In this case, a 1,024-dot horizontal effective pixel period in an input image signal is sampled 1,280 times to enlarge the horizontal dots to 1,280 dots. On the other hand, the number of vertical lines is increased from 768 to 960, defined by an approximate aspect ratio, by the vertical interpolation processing of the interpolation processing unit 1.05. Thus, the display apparatus 1.5 performs a display operation on a 1,280 dots (horizontal)×960 lines (vertical) effective display area.

In the interpolation processing, when image data is input at timings described in FIG. 21, the period required for inputting one horizontal line is 16.6 µs, and effective image data is included in 12.8 µs of this input period. In this vertical interpolation processing, five output lines must be formed with respect to four input lines. Therefore, as indicated by an equation in FIG. 21, the output period is determined to be 13.28 µs. Furthermore, the output cycle is determined in terms of the effective data period. In this case, the output cycle is determined to fall within the range from 67.5 MHz to 45.2 MHz. In the relationship between the input and output timings, the output must be started after two lines are input, and five lines must be output while four lines are input. FIG. 21 shows the relationship between the input lines and the FIFO memories 4.06.04. When lines with cycle numbers of input lines in the left table in FIG. 21 are input, lines with cycle line numbers described in the right table in FIG. 21 are controlled to be input to the FIFO memories 4.06.04.

An OSD (on-screen display) display operation that displays necessary information on the screen of the display apparatus 1.5 to facilitate various kinds of adjustment processing by an operator will be described below with reference to FIGS. 22, 23, 24, and 25, and FIGS. 26A and 26B which show control for enlarging the character size in the display control apparatus of this embodiment.

When the system control unit 1.91 detects an OSD display request by key input processing or the like by an operator, it transfers information such as OSD display start positions (horizontal, vertical), a display pattern, a font size, a display color, the presence/absence of blinking, a font space, and the like to the OSD control unit 1.93, thus attaining an OSD display, as shown in FIGS. 22 to 25.

Figure 22:
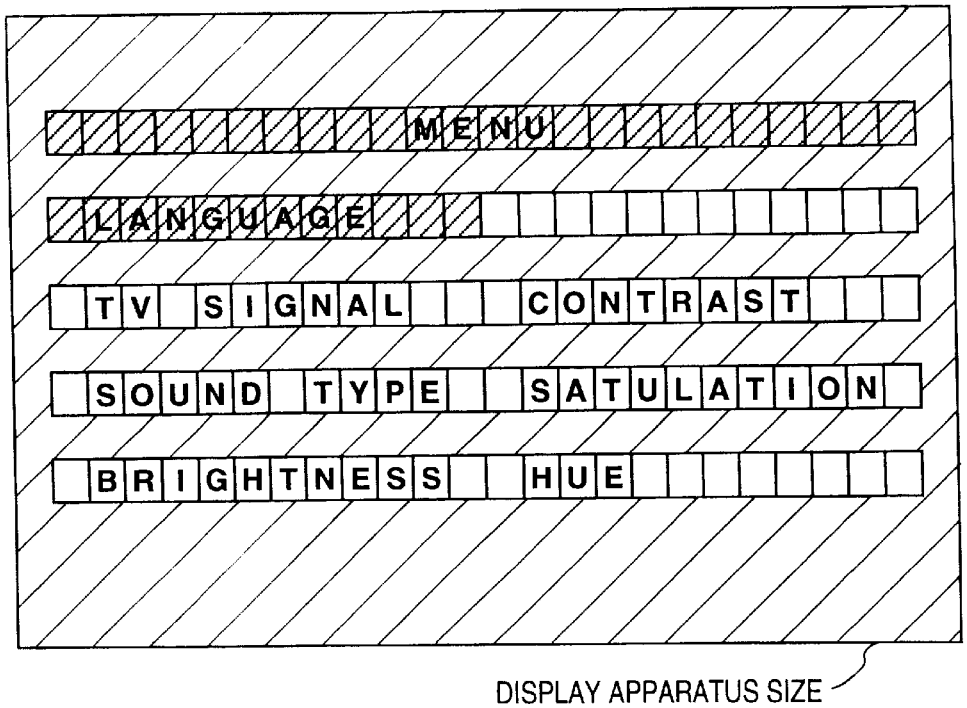
FIG. 22 is a view showing an OSD display example.
Figure 23:
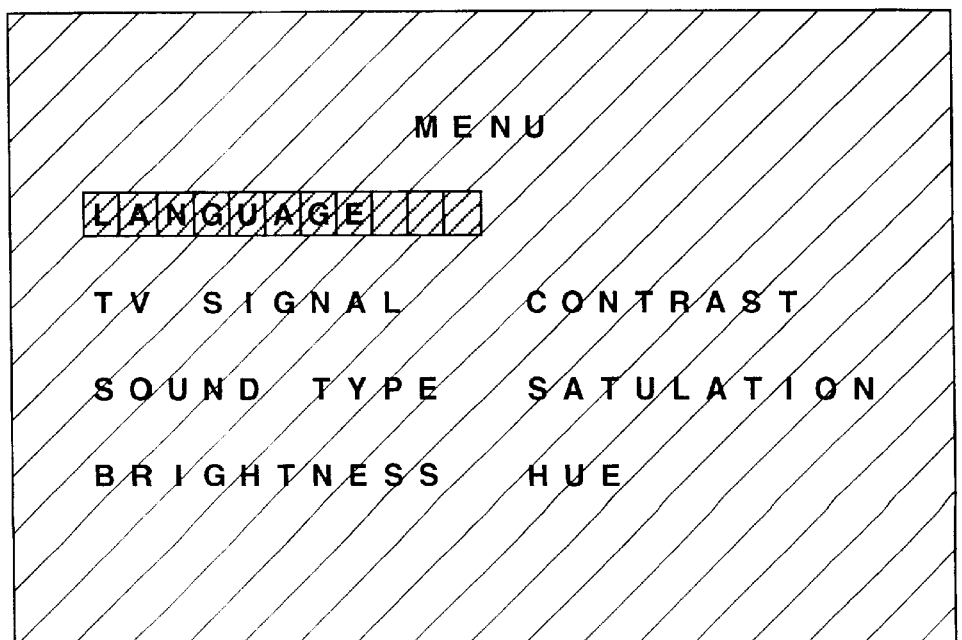
FIG. 23 is a view showing an OSD display example.

FIGS. 22 and 23 show OSD display examples of a menu screen of adjustment item selection processing in key input processing (to be described later). FIGS. 22 and 23 exemplify a case wherein a language selection item is selected as a setting item. FIG. 22 shows a display example with an opaque background of characters, and the selected item "LANGUAGE" is displayed in a color different from the background color of other items or is blinking, so as to be distinguished from other items. FIG. 23 shows a display example with a transparent background of characters. In this case, only the background of the selected item is opaque and is colored.

Figure 24:
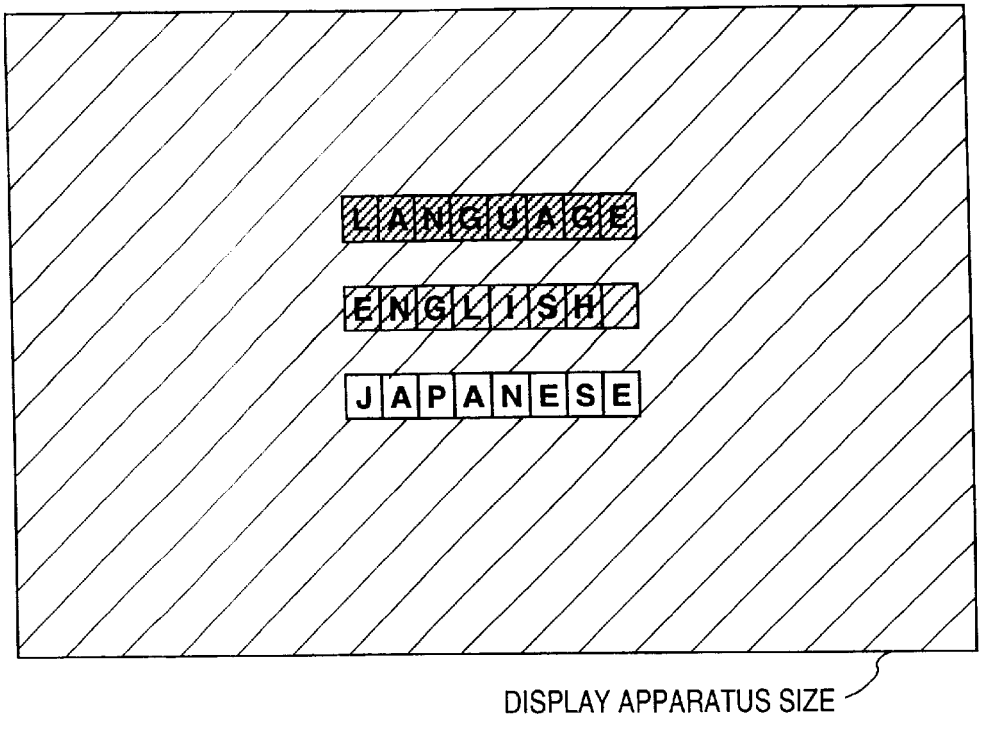
FIG. 24 is a view showing an OSD display example.

FIG. 24 shows an OSD display example when the item "LANGUAGE" is selected by adjustment item selection processing (to be described later) on the menu screen shown in FIG. 22. In this case, since items are displayed in an alternative way, one of items "ENGLISH" and "JAPANESE" is alternately selected upon depression of the UP/DOWN key, as described above.

Figure 25:
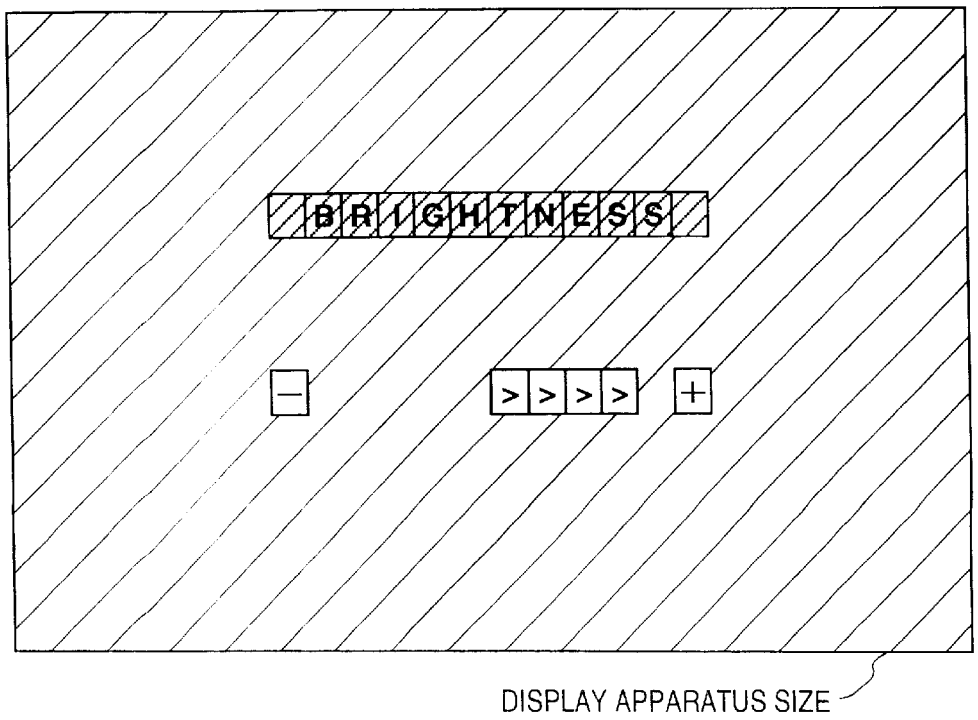
FIG. 25 is a view showing an OSD display example.

FIG. 25 shows an OSD display example when an item "BRIGHTNESS" is selected on the menu selection screen. In this case, the adjustment value changes stepwise upon depression of the UP/DOWN key. In this case, if 255 different setting values and 10 different OSD display levels are available, the OSD display level increases/decreases by one every time the setting value is increased/decreased by about 25.

Figure 26A:
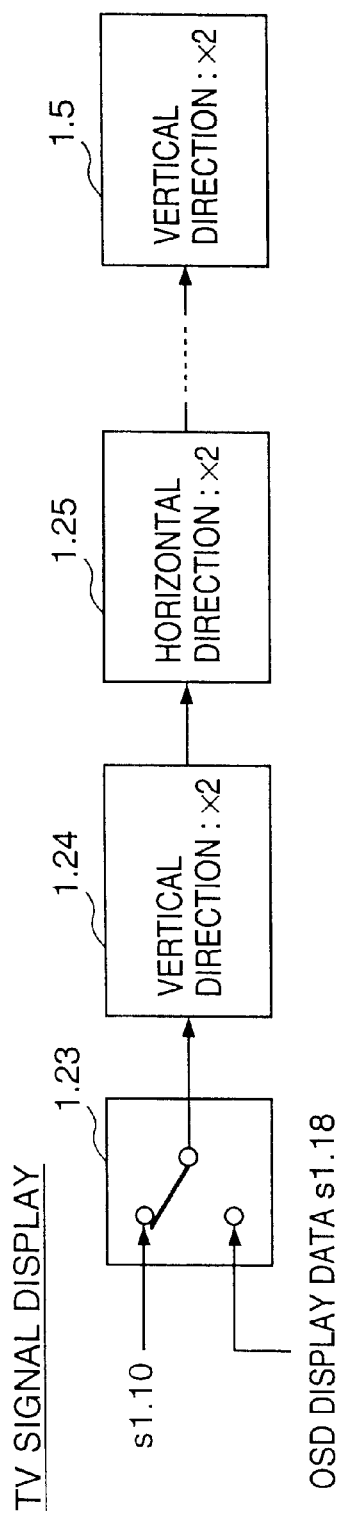
FIGS. 26A and 26B are block diagrams showing the control of the font size in the OSD display.
Figure 26B:
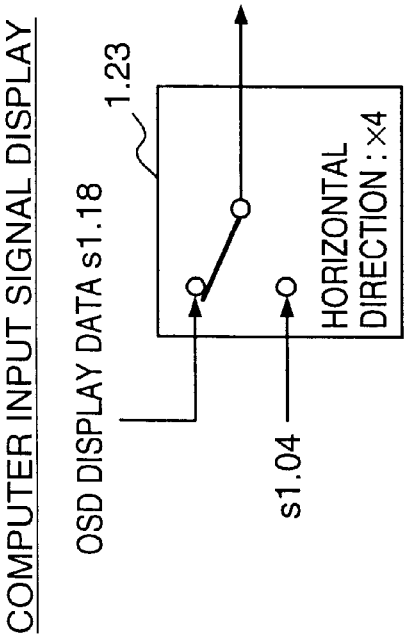

FIGS. 26A and 26B are diagrams for explaining the control of the font size in the OSD display mode. When a composite video signal s1.06 and a YC separated video signal s1.08 of, e.g., the NTSC, PAL system, or the like are to be displayed, OSD data s1.18 is enlarged to a x2 size in the vertical direction in the field/frame conversion unit 1.24. Furthermore, the enlarged data is enlarged to a x2 size in the horizontal direction in the horizontal interpolation processing unit 1.25. Moreover, the enlarged data is enlarged to a x2 size in the vertical direction since identical data is displayed on two horizontal lines. As a result, the input data is enlarged to the x2 size in the horizonal direction and to a total of x4 size in the vertical direction. For this reason, when the enlarged data is used in the OSD display mode, a font having a x4 size in both the horizontal and vertical directions can be displayed on the display apparatus 1.5.

On the other hand, when a computer input signal s1.01 is to be displayed, OSD data s1.18 is output from the switch unit 1.06 in place of the computer input signal s1.01. In this case, since the OSD data s1.18 is read out at the same clock speed as that of the computer input signal s1.01, identical data is read out four times. For this reason, the data is enlarged to a x4 size in the horizontal direction. When a font having a x1 size in the horizontal direction and a x4 size in the vertical direction is used in the OSD display mode, a font having a x4 size in both the horizontal and vertical directions can be displayed on the display apparatus 1.5, in the same manner as described above.

The user may select a x2 or x1 driving mode in the vertical direction by key input adjustment, and the system control unit may detect this change to control the OSD control unit 1.93. When the x2 driving mode in the vertical direction is selected, a font having a x2 size in the vertical direction is used.

FIG. 27 is a table showing a list of OSD display items in the video signal display mode and the computer signal display mode. In the display control apparatus of this embodiment, OSD display operations with different contents are performed in these two modes, as shown in FIG. 27. These display contents are held in the system control unit. Note that font data is held in the OSD control unit.

The OSD control unit 1.93 switches a switch unit 1.32 in the case of a video input signal (e.g., NTSC) or switches the switch unit 1.06 in the case of a computer input signal so as to output OSD data s1.18 in place of image data s1.10 or s1.04.

The switch unit 1.32 is switched by the system control unit 1.91 on the basis of the operator's choice in the key input processing (to be described later) to selectively transfer a video input signal s1.13 (e.g., NTSC) and a computer input signal s1.05 to the digital processing unit 1.4.

The key input processing from the operator will be described in detail below with reference to the flow charts of FIGS. 28 to 31 and FIG. 32 showing an example of keys that accept key inputs from the user.

Figure 31:
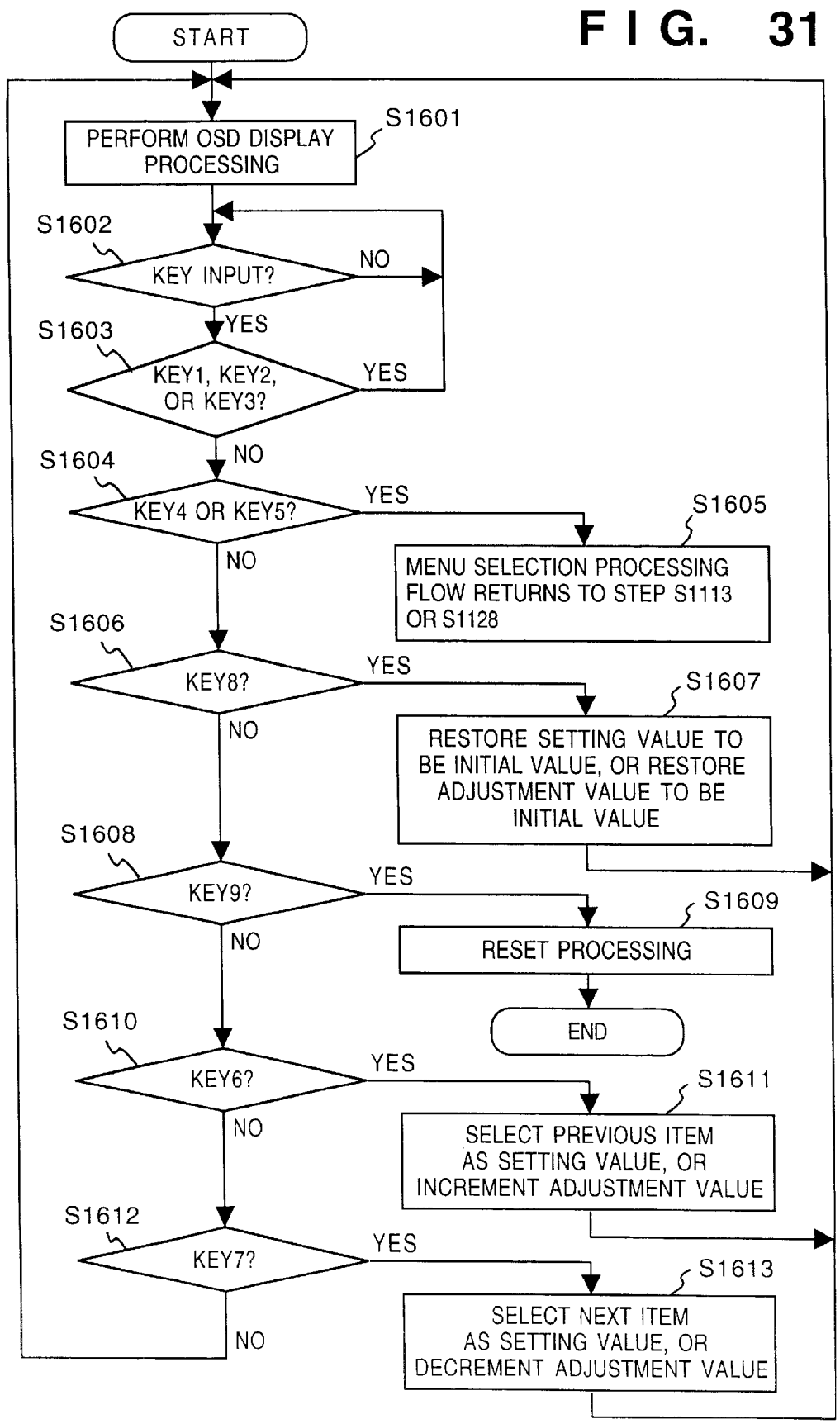
FIG. 31 is a flow chart for explaining the key input processing.
Figure 32:
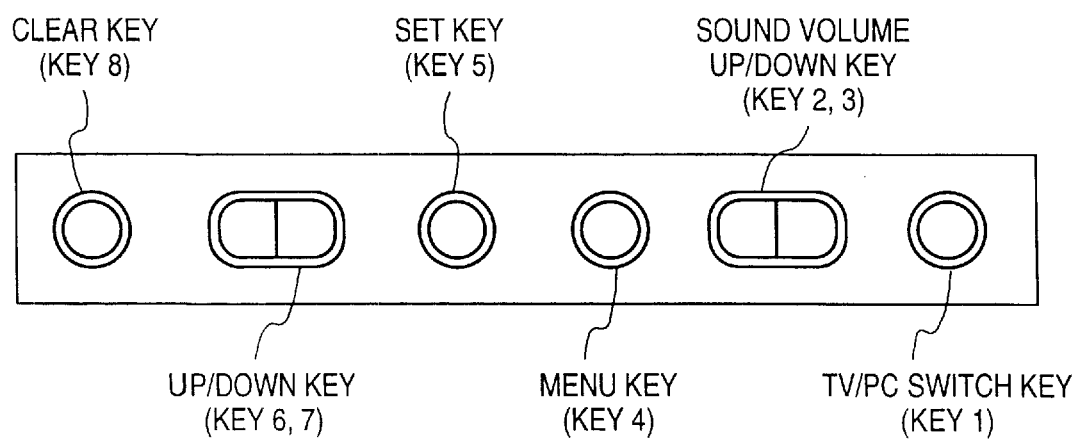
FIG. 32 is a view showing the outer appearance of a key operation panel.

FIGS. 28 to 31 are flow charts for explaining the key input processing of this embodiment. FIG. 32 is a view showing the outer appearance of a key operation panel of this embodiment.

Figure 28:
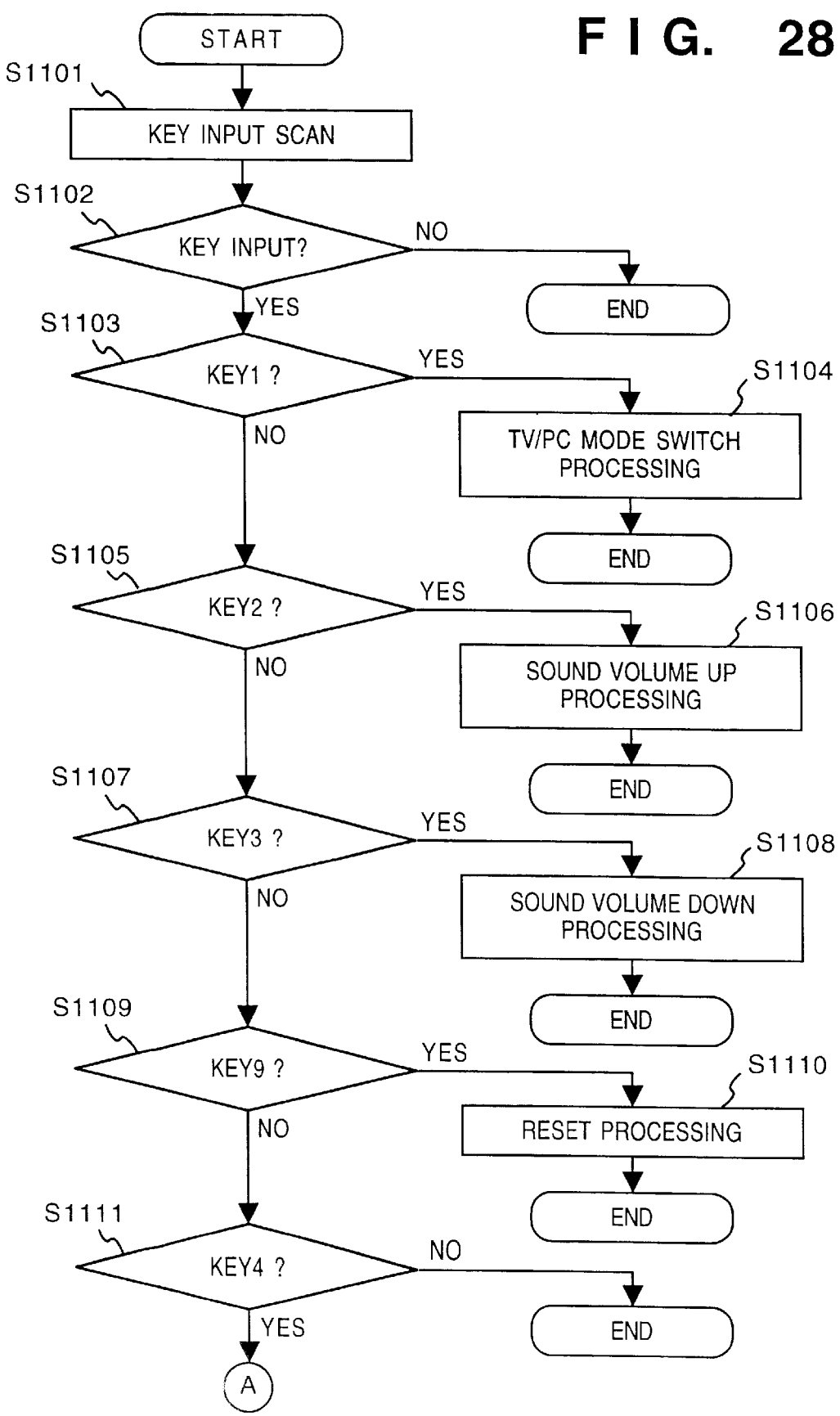
FIG. 28 is a flow chart for explaining the key input processing.
Figure 29A:
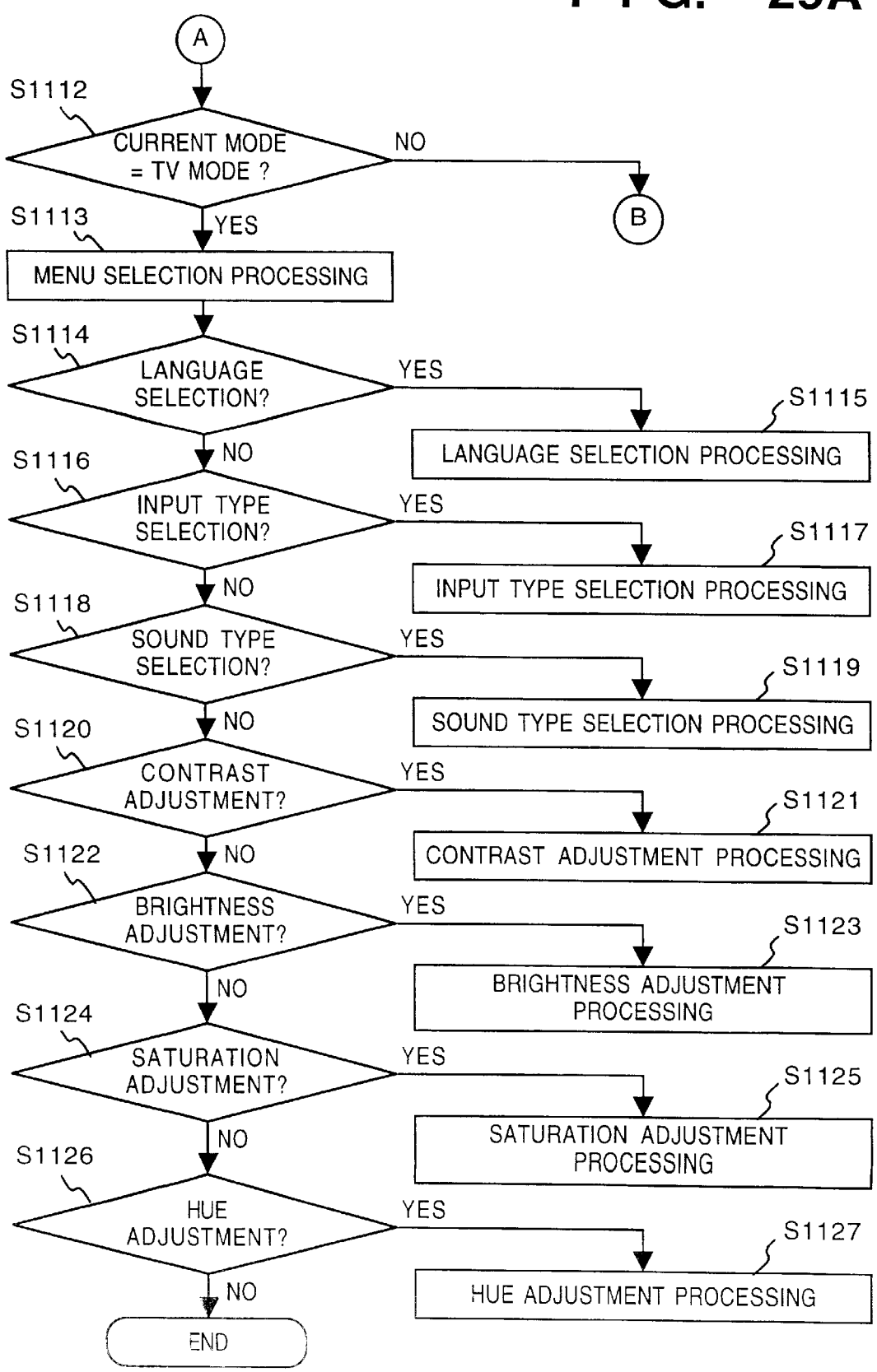
FIGS. 29A and 29B are flow charts for explaining the key input processing.
Figure 29B:
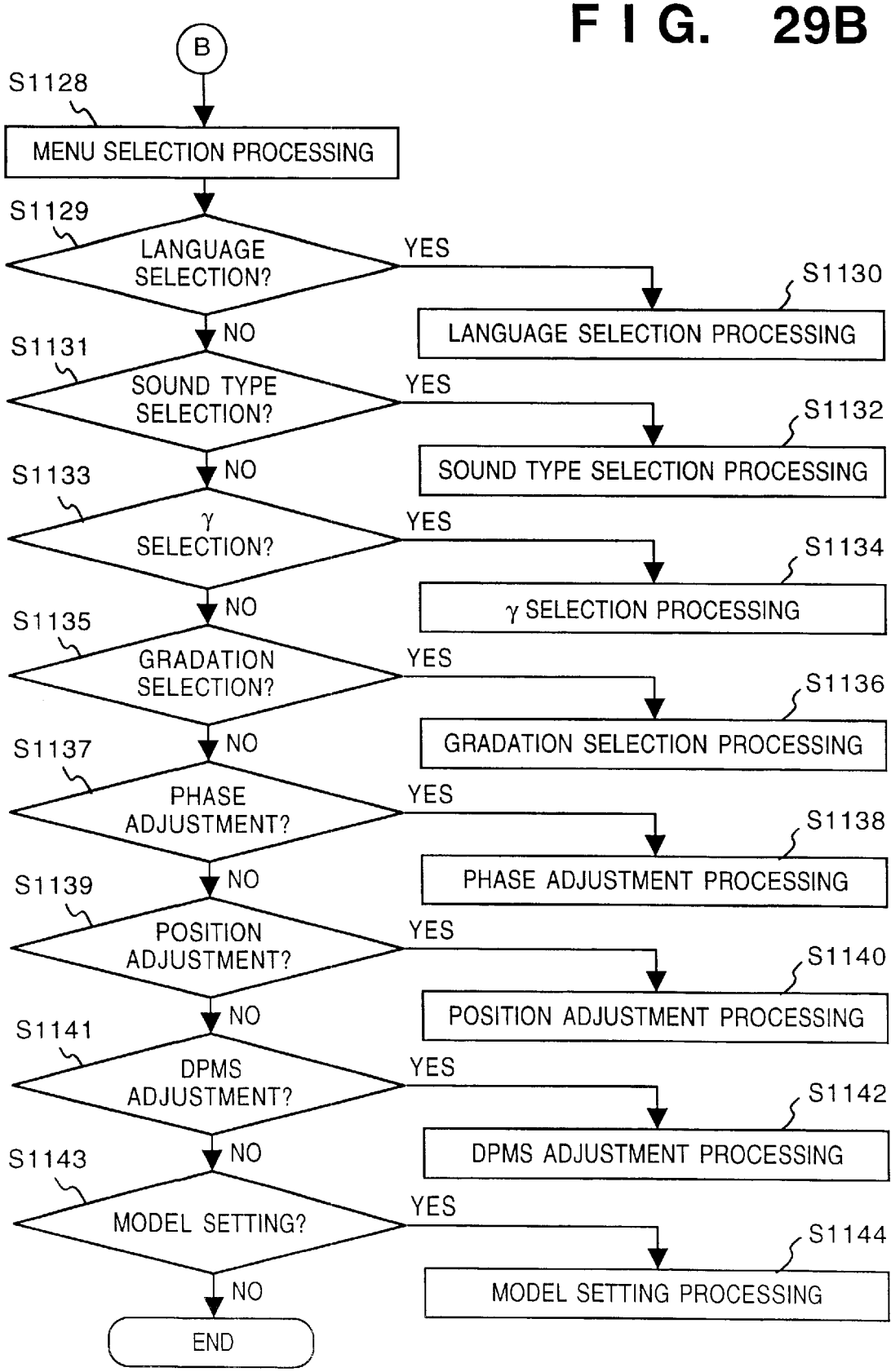
Figure 30:
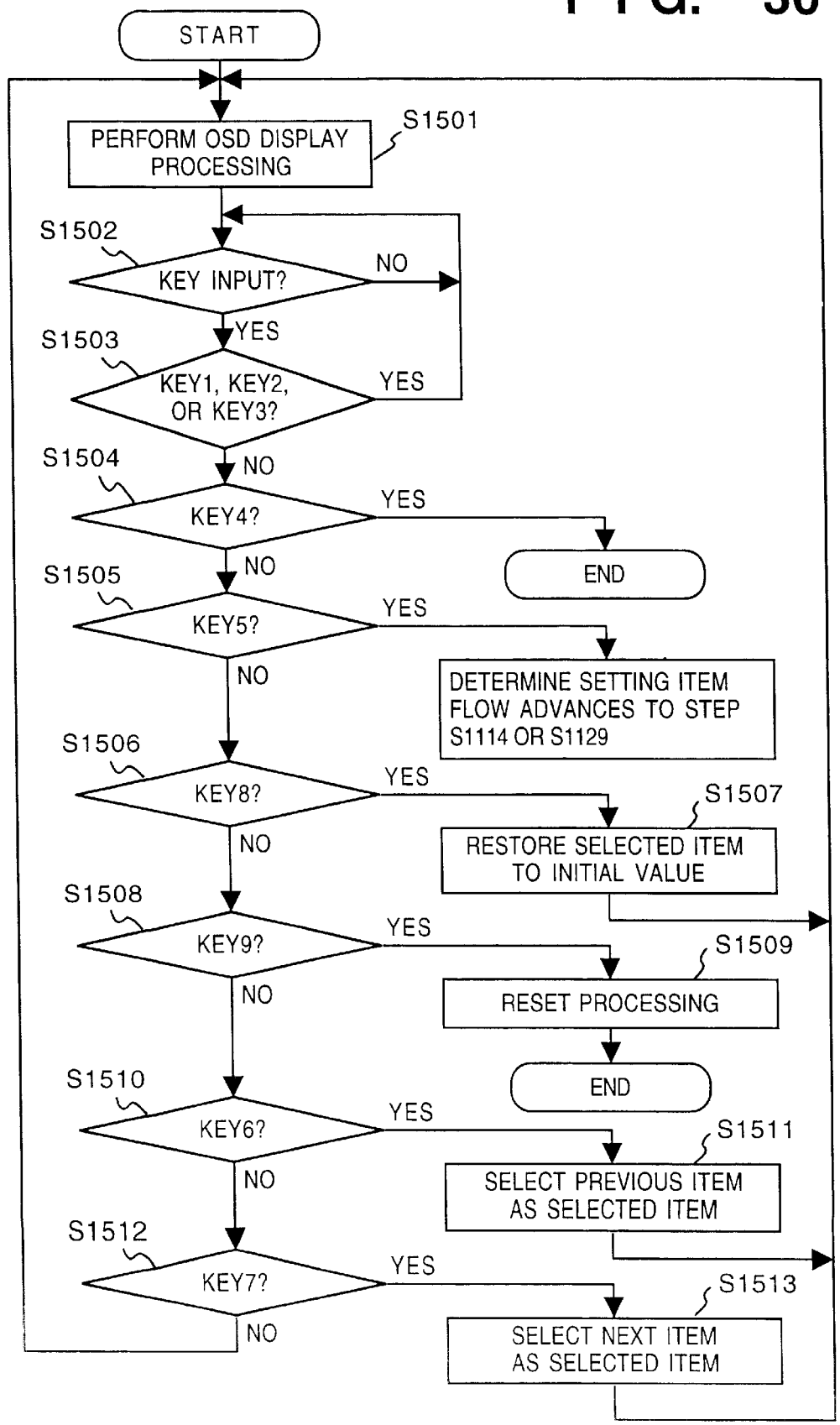
FIG. 30 is a flow chart for explaining the key input processing.

Referring to FIG. 28, the system control unit 1.91 performs key scan processing of a key matrix unit 1.92 in step S1101. It is checked in step S1102 if a key input is detected as a result of the key scan processing. If YES in step S1102, the flow advances to step S1103.

It is checked in step S1103 if the detected key input corresponds to a TV/PC switch key (KEY1) shown in FIG. 32. If YES in step S1103, TV/PC mode switch processing is performed in step S1104.

The TV/PC mode switch processing includes:
1. switch control of a switch unit 1.3
2. set TV/PC switch information in the interpolation processing unit 1.05
3. OSD display of TV/PC switch information Upon completion of the TV/PC mode switch processing, the key input processing ends. It is checked in step S1105 if the detected key input corresponds to a sound volume UP key (KEY2) shown in FIG. 32. If YES in step S1105, sound volume UP processing is performed in step S1106.

The sound volume UP processing includes:
1. set sound volume UP information in the audio signal processing unit 1.72
2. OSD display of the updated sound volume Upon completion of the sound volume UP processing, the key input processing ends.

It is checked in step S1109 if the clear key (KEY8) and the set key (KEY5) shown in FIG. 32 are simultaneously, continuously depressed for a predetermined period of time or more. If YES in step S1109, it is determined that the reset key is detected, and reset processing is performed in step S1110. The reset processing includes:

1. read out an initial setting value upon delivery from the factory from a nonvolatile memory 1.94 and set the readout value in the color decoder 1.22

2. read out an initial setting value upon delivery from the factory from the nonvolatile memory 1.94 and set the readout value in the audio signal processing unit 1.72

3. read out an initial setting value upon delivery from the factory from the nonvolatile memory 1.94 and set the readout value in the clock generation unit 1.04

4. read out an initial setting value upon delivery from the factory from the nonvolatile memory 1.94 and set the readout value in the interpolation processing unit 1.05

Upon completion of the reset processing, the key input processing ends.

It is checked in step S1111 if the detected key input corresponds to the menu key (KEY4). If YES in step S1111, the flow advances to step S1112. Otherwise, i.e., if another key, i.e., one of the set key, UP key, DOWN key, and clear key is detected, the key input processing immediately ends without any processing. In step S1112 in FIG. 29A, it is checked if the current mode is the TV or PC mode. If the current mode is the TV mode, the flow advances to step S1113; otherwise, the flow advances to step S1128.

In step S1113, the operator selects a setting item while observing the menu screen. The processing in step S1113 or S1128 will be explained below with reference to the flow chart in FIG. 30.

In step S1501, the OSD display processing is performed while the previously selected item is selected. In step S1502, the control waits until the operator performs a key input. It is checked in step S1503 if the key input by the operator is one of the TV/PC switch key, sound volume UP key, and sound volume DOWN key (one of KEY1 to KEY3). If YES in step S1503, the flow returns to step S1502 without any processing.

If NO in step S1503, the flow advances from step S1503 to step S1504. It is checked in step S1504 if the key input by the operator is the menu key (KEY4). If YES in step S1504, the processing ends; otherwise, the flow advances to step S1505.

It is checked in step S1505 if the key input by the operator is the set key (KEY5). If YES in step S1505, the setting item is determined in step S1514, and the flow advances to step S1114 or S1129.

If the key input by the operator is not the set key (KEY5), the flow advances to step S1506. It is checked in step S1506 if the key input by the operator is the clear key (KEY8). If YES in step S1506, the selected item is set to be an initial value in step S1507, and the flow returns to step S1501. If NO In step S1506, the flow advances to step S1508.

It is checked in step S1508 if the operator simultaneously, continuously depresses the clear key and the set key for a predetermined period of time or more. If YES in step S1508, a reset request is detected, and the reset processing is performed in step S1509, thus ending processing. If NO in step S1508, the flow advances to step S1510.

It is checked in step S1510 if the key input by the operator is the UP key (KEY6). If YES in step S1510, the previous item is selected in step S1511, and the flow returns to step S1501. If NO in step S1510, the flow advances to step S1512. It is checked in step S1512 if the key input by the operator is the DOWN key (KEY7). If YES in step S1512, the next item is selected in step S1513, and the flow returns to step S1501.

If the key input corresponds to none of the above-mentioned keys, the flow returns to step S1501 without any processing. Therefore, only when the menu key is input in step S1504 or when a reset request is detected in step S1508, the key input processing ends, and only when it is determined in step S1505 that the key input by the operator is the set key, the processing in step S1113 or S1128 in FIGS. 29A or B ends.

Referring back to FIG. 29A, it is checked in step S1114 if the adjustment item selected in step S1113 is the language selection item. If YES in step S1114, language selection processing is performed in step S1115. It is checked in step S1116 if the selected processing is input selection processing. If YES in step S1116, input selection processing (composite signal input/YC separated signal input) is performed in step S1117. It is checked in step S1118 if the selected processing is sound type selection processing. If YES in step S1118, sound type selection processing is performed in step S1119. It is checked in step S1120 if the selected processing is contrast adjustment processing. If YES in step S1120, contrast adjustment processing is performed in step S1121. It is checked in step S1122 if the selected processing is brightness adjustment processing. If YES in step S1122, brightness adjustment processing is performed in step S1123. It is checked in step S1124 if the selected processing is saturation adjustment processing. If YES in step S1124, saturation adjustment processing is performed in step S1125. It is checked in step S1126 if the selected processing is hue adjustment processing. If YES in step S1126, hue adjustment processing is performed in step S1127. If processing other than the above-mentioned processing operations is selected, the processing immediately ends.

The language selection processing in step S1115 will be described below with reference to FIG. 31. In step S1601, a language selection screen page is displayed in the OSD display mode. In step S1602, the control waits until the operator performs a key input. It is checked in step S1603 if the key input by the operator is one of the TV/PC switch key, sound volume UP key, and sound volume DOWN key (one of KEY1 to KEY3). If YES in step S1603, the flow returns to step S1602; otherwise, the flow advances to step S1604. It is checked in step S1604 if the key input by the operator is the menu key (KEY4) or the set key (KEY5). If YES in step S1604, the flow returns to step S1113 to perform the menu selection processing. If NO in step S1604, the flow advances to step S1606.

It is checked in step S1606 if the key input by the operator is the clear key. If YES in step S1606, the setting value is restored to that at the beginning of this processing in step S1607, and the flow then returns to step S1601. If NO in step S1606, the flow advances to step S1608. It is checked in step S1608 if the operator simultaneously, continuously depresses the clear key and the set key for a predetermined period of time or more. If YES in step S1608, a reset request is detected, and the reset processing is performed in step S1609, thus ending the language selection processing and the key input processing. If NO in step S1608, the flow advances to step S1610.

It is checked in step S1610 if the key input by the operator is the UP key. If YES in step S1610, the previous item is selected as the setting value or the setting value is incremented in step S1611. Then, the flow returns to step S1601. It is checked in step S1612 if the key input by the operator is the DOWN key. If YES in step S1612, the next item is selected as the setting value or the setting value is decremented in step S1613.

If NO in step S1612, it is determined that the key input by the operator is none of the above-mentioned keys, and the flow returns to step S1601 without any processing.

The same applies to the input type selection processing in step S1117, the sound type selection processing in step S1119, the contrast adjustment processing in step S1121, the brightness adjustment processing in step S1123, the saturation adjustment processing in step S1125, and the hue adjustment processing in step S1127.

On the other hand, in step S1128, the processing for selecting a setting item via the menu screen in the PC mode is performed as in step S1113. It is checked in step S1129 if the selected processing is the language selection processing. If YES in step S1129, the language selection processing is performed in step S1130. If NO in step S1129, the flow advances to step S1131. It is checked in step S1131 if the selected processing is the sound type selection processing. If YES in step S1131, the sound type selection processing is performed in step S1132. If NO in step S1131, the flow advances to step S1133.

It is checked in step S1133 if the selected processing is γ selection processing. If YES in step S1133, γ selection processing is performed in step S1134. If NO in step S1133, the flow advances to step S1135. It is checked in step S1135 if the selected processing is gradation selection processing. If YES in step S1135, gradation selection processing is performed in step S1136. If NO in step S1135, the flow advances to step S1137. It is checked in step S1137 if the selected processing is phase adjustment processing. If YES in step S1137, phase adjustment processing is performed in step S1138. If NO in step S1137, the flow advances to step S1139. It is checked in step S1139 if the selected processing is position adjustment processing. If YES in step S1139, display position adjustment processing is performed in step S1140. If NO in step S1139, the flow advances to step S1141.

It is checked in step S1141 if the selected processing is DPMS adjustment processing. If YES in step S1141, DPMS adjustment processing is performed in step S1142. If NO in step S1141, the flow advances to step S1143. It is checked in step S1143 if the selected processing is model setting processing. If YES in step S1143, model setting processing is performed in step S1144. If NO in step S1143, i.e., if processing other than the above-mentioned processing operations is selected, the key input processing immediately ends. Note that the above-mentioned discrimination processing, OSD display control, various adjustment selection processing control, and the like are performed by the system control unit 1.91.

Figure 33:
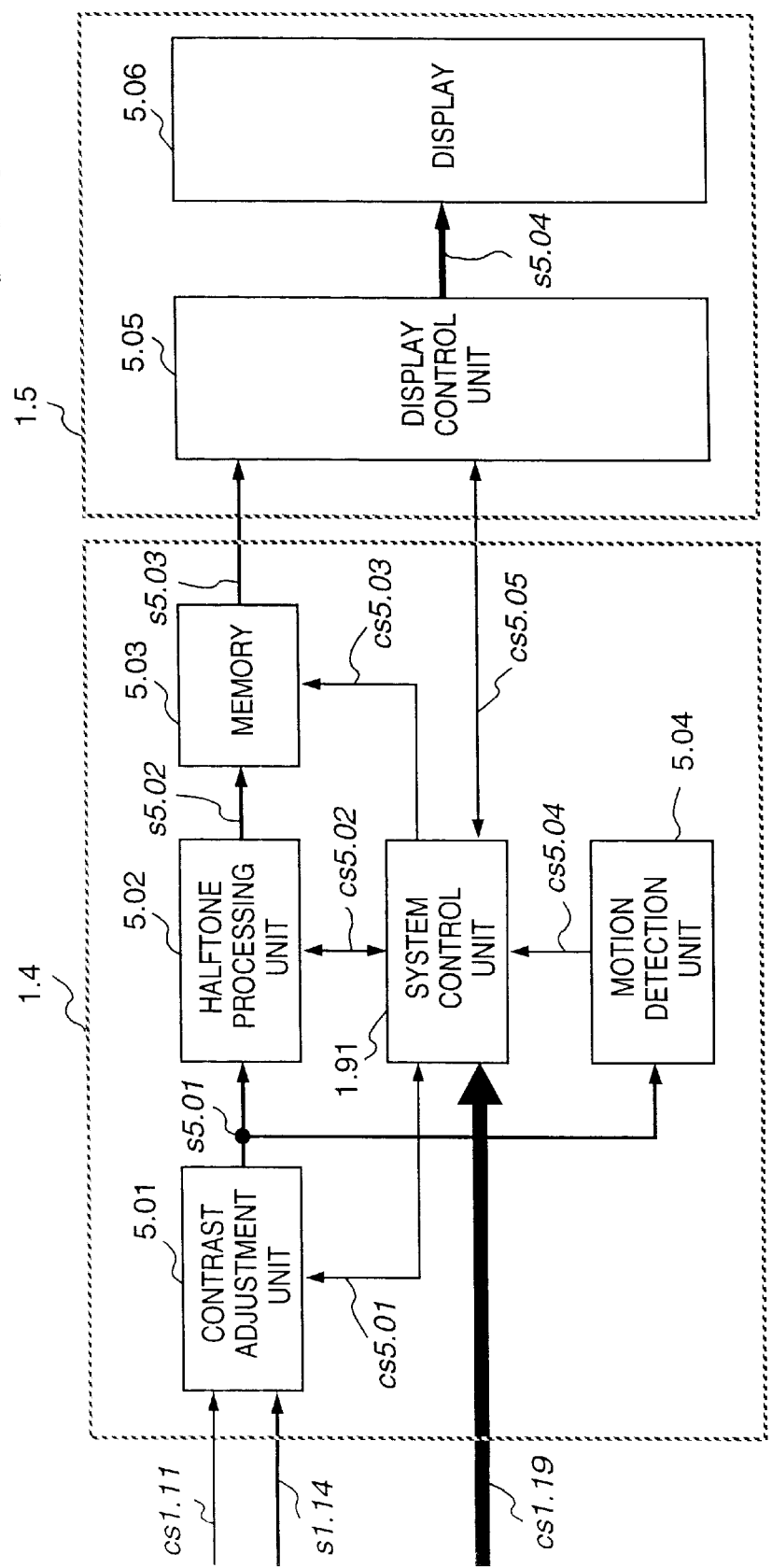
FIG. 33 is a block diagram showing the arrangement of a digital processing unit.

Processing performed in the digital processing unit 1.4 will be described below with reference to FIG. 33. FIG. 33 is a block diagram showing the arrangement of the digital processing unit of this embodiment. A video input signal s1.13 (e.g., NTSC) or a computer input signal s1.05 selectively input by the switch unit 1.32 is subjected to γ correction processing and gradation adjustment processing in a contrast adjustment unit 5.01.

Figure 34:
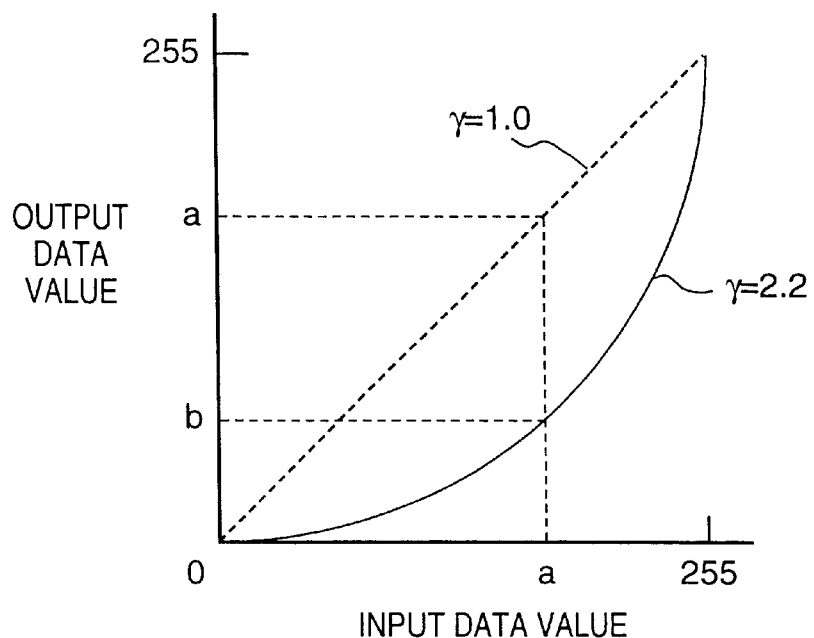
FIG. 34 is a graph for explaining the γ correction processing in the case of γ=2.2, an 8-bit input, and an 8-bit output.

The γ correction processing will be described below with reference to FIG. 34. FIG. 34 is a graph for explaining the γ correction processing in the case of γ=2.2, an 8-bit input, and an 8-bit output. For example, if the input data is a, the output data is also a when γ=1.0. However, when γ=2.2, the output data becomes b (<a), and an image with higher contrast than that when γ=1.0 can be obtained.

Figure 35:
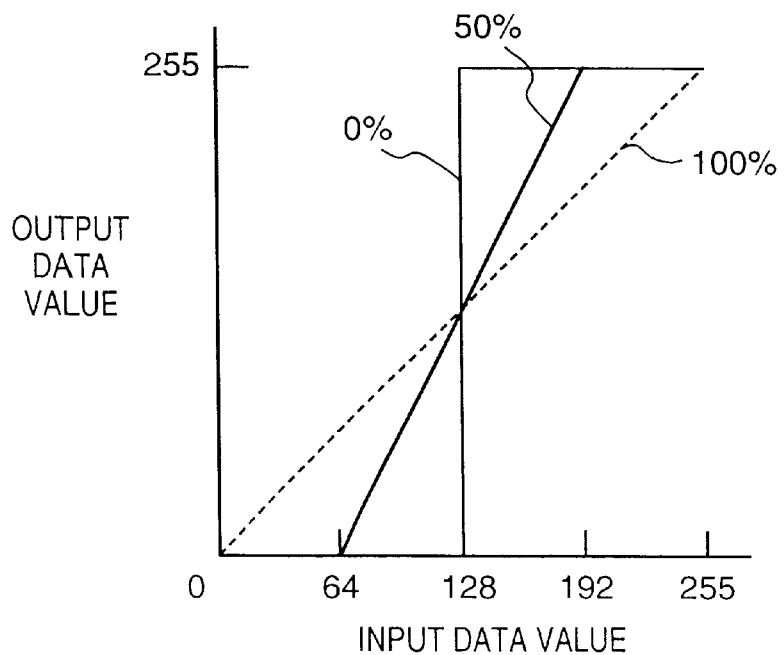
FIG. 35 is a graph for explaining the gradation adjustment processing.

The gradation adjustment processing will be described below with reference to FIG. 35. FIG. 35 is a graph for explaining the gradation adjustment processing in this embodiment. When this gradation adjustment processing is not performed, a linear output value is obtained with respect to an input value so as to realize. 100% characteristics shown in FIG. 35. On the other hand, when 50% gradation adjustment is performed, output values for input data ranging from 0 to 64 and from 192 to 255 are respectively fixed to be 0 and 255, and input data between these ranges change by an amount twice the input data. As the gradation adjustment value decreases (% lowers), an image with higher contrast can be obtained. Note that the adjustment values in the γ correction processing and the gradation adjustment processing are selected by the operator in the above-mentioned key input processing, and the system control unit 1.91 performs halftone processing of, e.g., an ED (error diffusion) method, a dither method, or the like.

Referring to FIG. 33, a motion detection unit 5.04 stores display data before the halftone processing, detects lines that have changed by a predetermined value or more, and transfers the detection result to the system control unit 1.91. The system control unit 1.91 outputs only the motion-detected line display data of those stored in a memory 5.03 to a display control unit 5.05 together with line address data.

The display control unit 5.05 displays the input line display data at the vertical position, designated by the line address data, on a display device 5.06.

A power supply unit 1.8 shown in FIG. 1 will be described below. The power supply unit 1.8 supplies electric power to the composite video signal processing unit 1.2, the computer image signal processing unit 1.1, the digital signal processing unit 1.4, and other units. The power supply unit 1.8 is controlled by the system control unit 1.91 to turn on/off the power supplies of the composite video signal processing unit 1.2, the computer image signal processing unit 1.1, and the digital processing unit 1.4.

In the above-mentioned arrangement, a control sequence for generating image data corresponding to the numbers of vertical and horizontal dots of the display apparatus 1.5 on the basis of a computer input signal (video signal) s1.01 having a given resolution will be summarized below.

Figure 36:
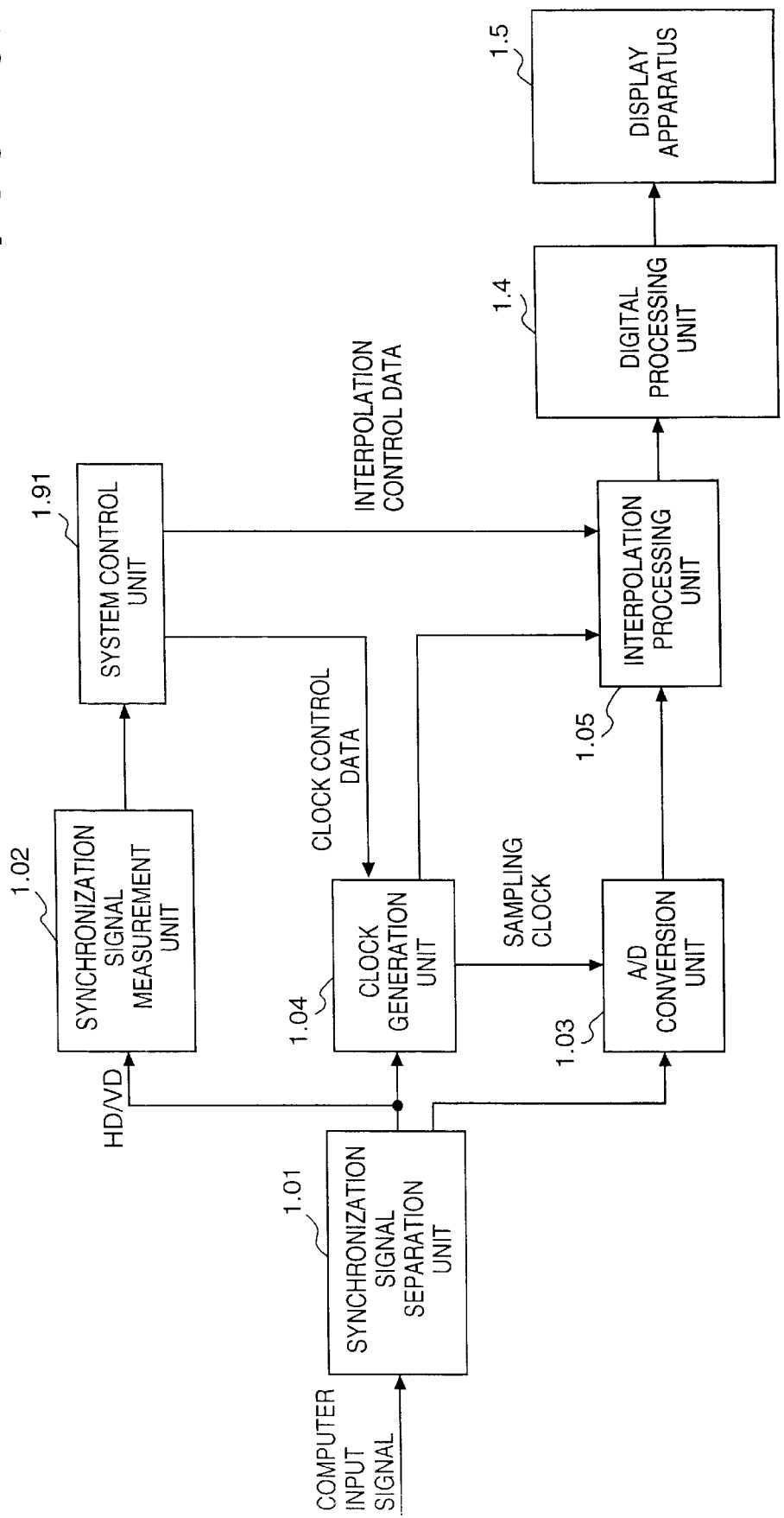
FIG. 36 is a schematic block diagram showing the display control of a computer input signal.

FIG. 36 is a schematic block diagram for explaining the display control of a computer input signal in this embodiment. A computer input signal (video signal) is separated into an image signal and synchronization signals (horizontal and vertical synchronization signals HD and VD) in the synchronization signal separation unit 1.01. The frequencies, and the like of the synchronization signals are measured by the synchronization signal measurement unit 1.02, and the system control unit 1.91 sets a display mode on the basis of the measured frequencies.

The system control unit 1.91 determines the number of dots to be sampled, and the like from effective image data for one scan period on the basis of the set display mode, and outputs it as clock control data to the clock generation unit 1.04. The clock generation unit 1.04 generates sampling clocks on the basis of the synchronization signals and the clock control data, and supplies the clocks to the A/D conversion unit 1.03. The A/D conversion unit 1.03 samples the image signal in accordance with the supplied sampling clocks to generate scan data having a required number of dots. Note that the clock generation unit 1.04 in this embodiment generates clocks based on PLL control.

The generated scan data is supplied to the interpolation processing unit 1.05. On the other hand, the system control unit 1.91 generates interpolation control data indicating, e.g., the ratio of interpolation of scan lines on the basis of the set display mode, and supplies the data to the interpolation processing unit 1.05. The interpolation processing unit 1.05 performs interpolation processing on the basis of the input scan data and the interpolation control data to generate image data corresponding to pixels of the display apparatus 1.5, and supplies the generated data to the digital processing unit 1.4. The digital processing unit 1.4 binary-converts the image data while maintaining halftone levels (by, e.g., the error diffusion method), and displays the binary data on the display apparatus 1.5.

As described above, according to this embodiment, since the horizontal effective pixel period is sampled by a predetermined number of pixel data, no special interpolation device is required, and enlargement can be performed without requiring any resolution discrimination at an approximate resolution of about 640 dots or 720 dots while the frequency remains the same. In the vertical direction, by combining the x2 enlargement display function of the dot matrix display device and the enlargement function between x1 and x2 of the vertical interpolation function, the enlargement display operation can be arbitrarily performed up to a maximum of x4. By performing halftone processing for data after the horizontal and vertical interpolation processing operations, deterioration of an image caused by the interpolation processing can be suppressed.

Note that the present invention may be applied to either a system constituted by a plurality of devices or an apparatus consisting of a single device. Also, the present invention may be applied to a case wherein the invention is attained by the present invention.

Another embodiment will be described below.

In an embodiment to be described below, an enlargement means in the horizontal direction, which performs an enlargement display operation by sampling the effective pixel period at a horizontal resolution equal to the number of dots that can be displayed on the dot matrix display, as described in the above embodiment, adopts the same method as the above-mentioned interpolation method in the vertical direction.

In this embodiment, the data sampling timing in the horizontal direction is different from that in the above embodiment. In this embodiment, sampling is performed at the same resolution as the output resolution of the personal computer or workstation. Therefore, the clock generation unit 1.04 generates a dot clock signal equal to a pixel output clock signal of data for outputting a display image.

Figure 37:
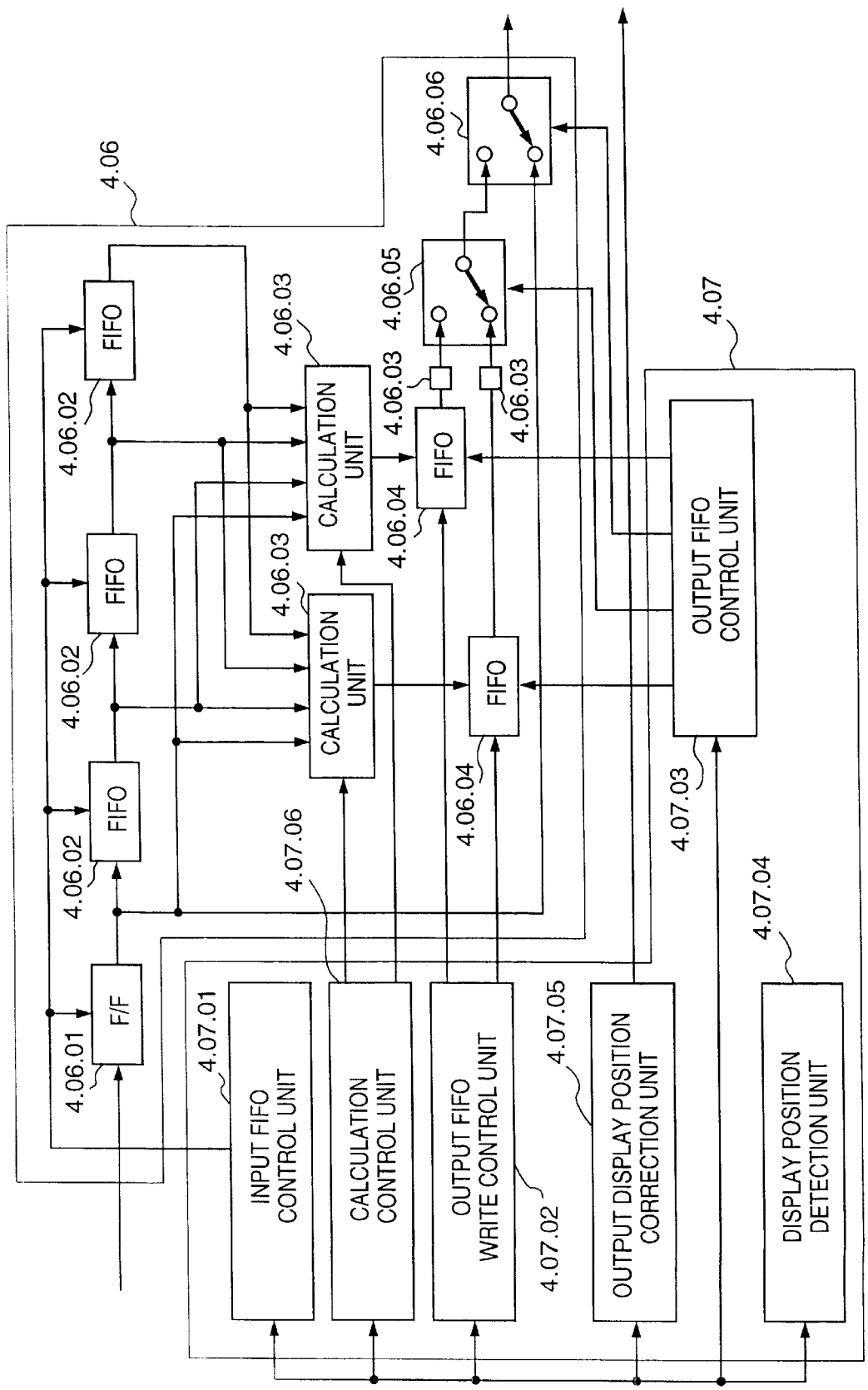
FIG. 37 is a block diagram showing another embodiment of the interpolation processing unit 4.06 and the interpolation control unit 4.07 shown in FIG. 12.

FIG. 37 is a block diagram showing the arrangement including this function in addition to the above embodiment.

Referring to FIG. 37, a horizontal interpolation device 4.06.03.01 is obtained by replacing the function of the vertical interpolation unit of the above-mentioned interpolation processing unit 4.06 by a horizontal interpolation function.

Figure 38:
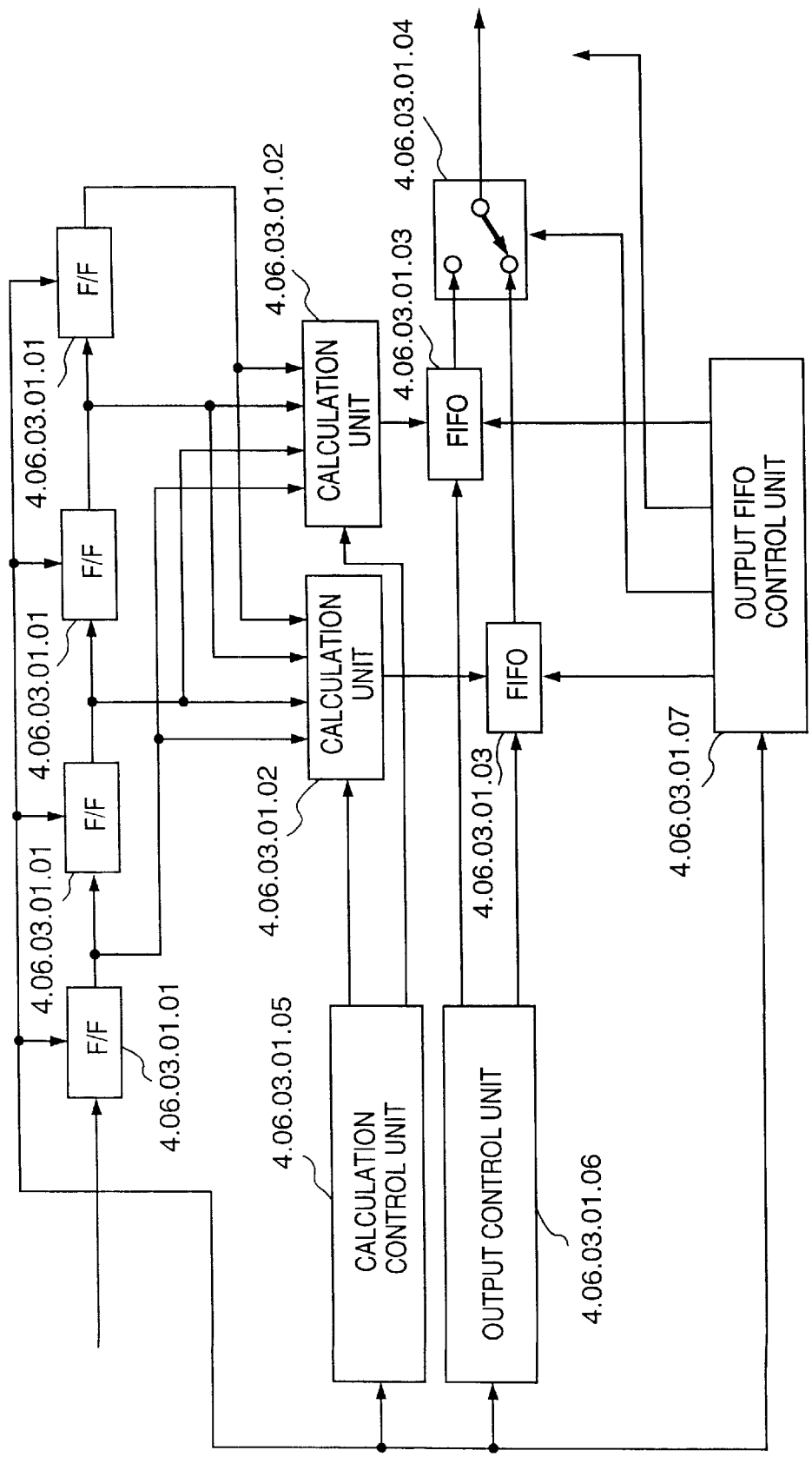
FIG. 38 is a detailed block diagram showing a horizontal interpolation device 4.06.03.1 shown in FIG. 37.

FIG. 38 is a detailed block diagram of the horizontal interpolation device 4.06.03.01 shown in FIG. 37.

Referring to FIG. 38, reference numeral 4.06.03.01.01 denotes F/F circuits for storing input image data while shifting them; and 4.06.03.01.02, calculation units for calculating input image data using interpolation coefficients. Reference numeral 4.06.03.01.03 denotes output FIFO memories for storing image data obtained after the interpolation calculations. Reference numeral 4.06.05 denotes a switch unit for selecting the outputs from the output FIFO memories 4.06.03.01.03 and transferring the selected outputs to a switch unit 4.06.03.01.04.

Reference numeral 4.06.03.01.06 denotes an output control unit for controlling the timings of the calculation units 4.06.03.01.02 and the write timings of the FIFO memories 4.06.03.01.03. Reference numeral 4.06.03.01.07 denotes an output FIFO control unit for controlling the read timings of the output FIFO memories 4.06.03.01.03.

Reference numeral 4.06.03.01.05 denotes a calculation control unit for controlling exponents in units of lines.

In the above arrangement, input image data is input to the F/F circuits 4.06.03.01.01, and image data delayed by one pixel are sequentially transferred. The calculation units 4.06.03.01.02 receive horizontally aligned image data and generates horizontal interpolation pixels in accordance with a control signal from the calculation control unit 4.06.03.01.05. The generated horizontal interpolation pixels are stored in the FIFO memories 4.06.03.01.03 on the basis of a signal from the output control unit 4.06.03.01.06. The stored image data are read out in response to a signal from the output FIFO control unit 4.06.03.01.07 and are transferred to the switch unit 1.06 via the switch unit 4.06.03.01.04.

When the system control unit 1.91 determines based on the measurement result form the synchronization signal measurement unit 1.02 that the number of lines of an input signal matches that of the display apparatus 1.5, it switches the switch unit 1.06 to directly output the input signal without performing the interpolation processing of the interpolation processing unit 1.05.

Other processing operations are the same as those in the above embodiment. According to this embodiment, since higher-grade image enlargement processing is performed as compared to the above embodiment, image quality can be improved.

As described above, according to the above embodiment, the display control of the dot matrix display can be appropriately attained in correspondence with a plurality of different resolutions of a CRT image signal of, e.g., a personal computer, and an image can be displayed in correspondence with the display area of the display independently of the resolution of image data. At this time, an OSD control window used for performing various setting operations can always be displayed with a fixed size, thus allowing an easy operation. OSD data operation can be appropriately switched and displayed in correspondence with display states with different image resolutions and dot clocks.

The present invention can be applied to a system constituted by a plurality of devices (e.g., host computer, interface, reader, printer) or to an apparatus comprising a single device (e.g., copy machine, facsimile).

As many apparently widely different embodiments of the present invention can be made without departing from the spirit and scope thereof, it is to be understood that the invention is not limited to the specific embodiments thereof except as defined in the appended claims.

What is claimed is:

1. A display control apparatus for controlling a display operation of a display device, comprising:

input means for inputting an image signal of an image to be displayed by the display device;

discrimination means for discriminating a display mode of the image signal;

holding means for holding a plurality of on-screen-display data each of which has a different font size;

first selection means for selecting on-screen-display data to be multiplexed to the image signal from the plurality of on-screen-display data held by said holding means on the basis of the display mode discriminated by said discrimination means;

second selection means for selecting appropriate interpolation methods to be adaptively combined for interpolating the on-screen-display data selected by said first selection means; and means for outputting the on-screen-display data interpolated by applying a combination of the interpolation methods selected by said second selection means to the on-screen-display data selected by said first selection means.

2. The apparatus according to claim 1, wherein said first selection means selects the on-screen-display data from said holding means so as to obtain an appropriate character size and shape in each display mode.

3. The apparatus according to claim 2, wherein the font size and shape are determined on the basis of a dot clock speed in each display mode and an input speed of the on-screen display data by said input means.

4. The apparatus according to claim 1, wherein the data has display contents corresponding to respective display modes, and said first selection means selects the data having appropriate display contents in each display mode.

5. The apparatus according to claim 1, wherein a plurality of display modes include a first display mode for displaying at least a composite video signal, and a second display mode for displaying a computer CRT signal.

6. The apparatus according to claim 5, wherein when the on-screen display data is displayed in the first display mode, said output means performs, for the input on-screen display data, the same processing as processing that is performed for an RGB signal obtained by converting the composite video signal, and outputs the processed on-screen display data.

7. A display apparatus for performing an image display operation on the basis of a signal output from a display control apparatus described in claim 1.

8. The apparatus according to claim 7, wherein the image display operation is performed on a dot matrix display.

9. A display control method of controlling a display operation of a display device, comprising the steps of:

inputting an image signal;

discriminating a display mode;

holding a plurality of on-screen-display data each of which has a different font size in a holder;

firstly selecting on-screen-display data to be multiplexed to the image signal from the plurality of on-screen-display data held by the holder on the basis of the display mode discriminated in the discrimination step;

secondly selecting appropriate interpolation methods to be adaptively combined for interpolating the on-screen-display data selected in the first selecting step; and outputting the on-screen-display data interpolated by applying a combination of the interpolation methods selected in the second selecting step to the on-screen-display data selected in the first selecting step.

10. A display control apparatus for controlling a display operation of a display device, comprising:

input means for inputting a plurality of image signals, each of which has been obtained from a different source;

discrimination means for discriminating a display mode of the image signals input by said input means;

holding means for holding a plurality of on-screen-display data each of which has a different font size;

selection means for selecting the on-screen-display data having a suitable font size for the display mode of the image signal discriminated by said discrimination means from the plurality of on-screen-display data held by said holding means; and output means for multiplexing the on-screen-display data selected by said selection means to the image signal input by said input means and for outputting the multiplexed signal to the display device.

11. An apparatus according to claim 10, wherein the image signal input by said input means includes a composite video signal and a computer image signal.

12. An apparatus according to claim 11, wherein the display mode includes a first mode for displaying an image according to the composite video signal and a second mode for displaying an image according to the computer image signal.

13. An apparatus according to claim 10, wherein said display device comprises a flat panel display device.

* * * * *

UNITED STATES PATENT AND TRADEMARK OFFICE
CERTIFICATE OF CORRECTION

| | |
|---|---|
| PATENT NO. : 6,215,467 B1 | |
| DATED : April 10, 2001 | |
| INVENTOR(S) : Kazumi Suga et al. | |

It is certified that error appears in the above-identified patent and that said Letters Patent is hereby corrected as shown below:

Title page,
Item [56], References Cited,
U.S. PATENT DOCUMENTS, "Imarishi" should read -- Imanishi -- and "Regi et al." should read -- Degi et al. --.

Drawings,
Sheet 18, FIG. 22, "SATULATION" should read -- SATURATION --.
FIG. 23, "SATULATION" should read -- SATURATION --.

Column 4,
Line 27, "y" should read -- $\gamma$ --.

Column 13,
Line 37, "b8(n30 1)=(1/4+1/8)*a5(n+1)+(1/2+1/8)*a5(n+1)+1" should read -- b8(n+1) =(1/4+1/8)*a5(n+1)+(1/2+1/8)*a5(n+1)+1 --.
Line 55, "1)++1+(-1/16+-1/32)a5(n+1)+2" should read -- 1)+1+(-1/16+-1/32)a5(n+1) +2 --.

Signed and Sealed this

Fourth Day of December, 2001

*Attest:*

*Attesting Officer*

NICHOLAS P. GODICI
*Acting Director of the United States Patent and Trademark Office*